(12) United States Patent
Lundquist

(10) Patent No.: US 11,506,786 B2
(45) Date of Patent: Nov. 22, 2022

(54) LASER DETECTION AND RANGING

(71) Applicant: Arete Associates, Longmont, CO (US)

(72) Inventor: Paul B. Lundquist, Longmont, CO (US)

(73) Assignee: Arete Associates, Longmont, CO (US)

( * ) Notice: Subject to any disclaimer, the term of this patent is extended or adjusted under 35 U.S.C. 154(b) by 265 days.

(21) Appl. No.: 16/833,867

(22) Filed: Mar. 30, 2020

(65) Prior Publication Data

US 2021/0255323 A1     Aug. 19, 2021

Related U.S. Application Data

(60) Provisional application No. 62/976,625, filed on Feb. 14, 2020.

(51) Int. Cl.
*G01S 17/06*     (2006.01)
*G01S 17/89*     (2020.01)
*G01S 7/481*     (2006.01)

(52) U.S. Cl.
CPC ............. *G01S 17/06* (2013.01); *G01S 7/4811* (2013.01); *G01S 17/89* (2013.01)

(58) Field of Classification Search
CPC .......... G01S 17/06; G01S 17/42; G01S 17/89; G01S 7/4811; G01S 17/48; G01S 17/50; G01S 17/88; G01S 17/894; G01S 17/93–933; G01S 17/32; G01S 17/46; G01S 7/48; G01S 7/4808; G01S 7/481; G01S 7/4814; G01S 7/4817; G01S 7/483; G01S 7/523; G01S 7/53; G01S 7/531
USPC ....................................... 356/3–22, 614–624
See application file for complete search history.

(56) References Cited

U.S. PATENT DOCUMENTS

| | | | |
|---|---|---|---|
| 5,485,009 | A | 1/1996 | Meyzonnetie |
| 6,542,227 | B2 | 4/2003 | Jamieson et al. |
| 7,336,345 | B2 | 2/2008 | Krasutsky |
| 7,746,449 | B2 | 6/2010 | Ray et al. |
| 7,969,558 | B2 | 6/2011 | Hall |
| 9,463,574 | B2 | 10/2016 | Purkayastha et al. |
| 10,061,019 | B1 | 8/2018 | Campbell et al. |

(Continued)

FOREIGN PATENT DOCUMENTS

JP          2020016481 A  *  1/2020  ............. G01S 17/10

OTHER PUBLICATIONS

Morales et al., Analysis of 3D Scan Measurement Distribution with Application to a Multi-Beam Lidar on a Rotating Platform, Jan. 30, 2018.

*Primary Examiner* — Christina A Riddle
(74) *Attorney, Agent, or Firm* — FisherBroyles, LLP; Gregory T. Fettig

(57) ABSTRACT

Systems and methods herein provide for Laser Detection and Ranging (Lidar). One Lidar system includes a laser operable to generate laser light. The system also includes a transmitter operable to rotate at a first rate, and to transmit the laser light along a first path from the Lidar system to a target. The system also includes a receiver operable to rotate at the first rate, and to receive at least a portion of the laser light along a second path from the target. The first and second paths are different. The system also includes a processor operable to calculate a range and an angle to the target using an angular displacement between the second path and the receiver that arises from the first rate of rotation for the transmitter and the receiver.

20 Claims, 19 Drawing Sheets

(56) References Cited

U.S. PATENT DOCUMENTS

| | | |
|---|---|---|
| 10,222,459 B2 | 3/2019 | Sparbert et al. |
| 10,222,474 B1 | 3/2019 | Raring et al. |
| 10,324,171 B2 | 6/2019 | Niclass et al. |
| 2003/0043058 A1 | 3/2003 | Jamieson et al. |
| 2011/0149268 A1 | 6/2011 | Marchant et al. |
| 2016/0041266 A1 | 2/2016 | Smits |
| 2018/0011173 A1 | 1/2018 | Newman |
| 2018/0275275 A1 | 9/2018 | Lundquist |
| 2018/0284282 A1 | 10/2018 | Hong et al. |
| 2018/0364334 A1* | 12/2018 | Xiang .................. G01S 17/931 |
| 2019/0162828 A1 | 5/2019 | Liang et al. |
| 2019/0331774 A1 | 10/2019 | Jackson |
| 2019/0353758 A1 | 11/2019 | Shin et al. |
| 2020/0033474 A1 | 1/2020 | Petit |
| 2020/0150209 A1 | 5/2020 | Kirillov |
| 2020/0284883 A1 | 9/2020 | Ferreira et al. |

\* cited by examiner

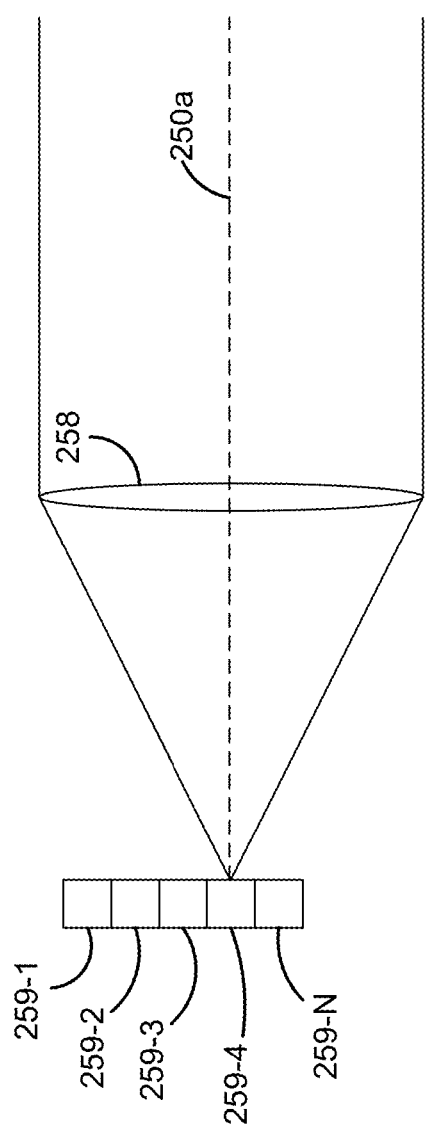
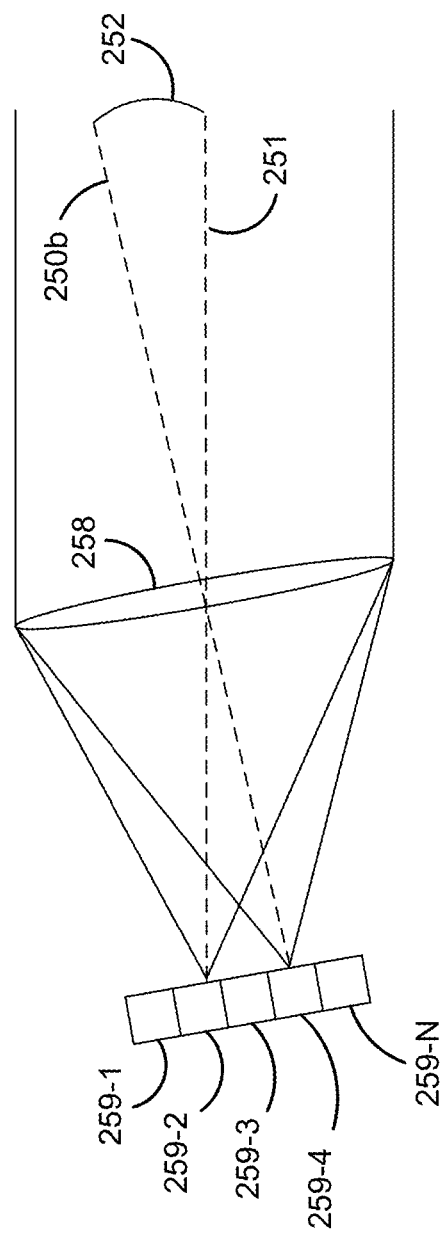
FIG. 19A
FIG. 19B

LASER DETECTION AND RANGING

CROSS REFERENCE TO RELATED APPLICATIONS

This patent application claims priority to, and thus the benefit of an earlier filing date from, U.S. Provisional Patent Application No. 62/976,625 (filed Feb. 14, 2020), the contents of which are hereby incorporated by reference.

BACKGROUND

Light Detection and Ranging, or "Lidar" (also referred to as Laser Detection and Ranging, or "LADAR") generally involves propagating a pulse of laser light to an object and measuring the time it takes for the pulse to scatter and return from the object. Since, light moves at a constant and known speed (i.e., ~$3\times10^8$ meters per second in air), the Lidar system can calculate the distance between itself and the target. However, these pulsed Lidar systems can produce range ambiguities for a variety of reasons. For example, if all pulses are essentially the same, the Lidar system may not know which pulse is being received at any given time. Thus, the Lidar system may not know the correct time it took for a pulse to return from a target.

SUMMARY

Lidar systems and methods presented herein employ rotating transmitter and receiver elements. For example, in one embodiment, a Lidar system includes a laser operable to generate laser light (e.g., continuous wave, or "CW" laser light). The Lidar system also includes a transmitter operable to rotate at a first rate, and to transmit the laser light along a first path from the Lidar system to a target. The Lidar system also includes a receiver operable to rotate at the first rate, and to receive at least a portion of the laser light along a second path from the target. The first and second paths are different. A processor may be configured to calculate a range and angle to the target using an angular displacement between the receiver and the second path that arises from the first rate of rotation. That is, a processor may be configured to calculate the range and angle to the target using the angular rotation of the receiver over the duration the laser light traverses first path and the second path.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

FIGS. 19A, 19B, and 20 illustrate exemplary displacement calculations based on angular velocity of a scanner of the CW Lidar system.

DETAILED DESCRIPTION OF THE FIGURES

The figures and the following description illustrate specific exemplary embodiments. It will thus be appreciated that those skilled in the art will be able to devise various arrangements that, although not explicitly described or shown herein, embody certain principles and are included within the scope of the embodiments. Furthermore, any examples described herein are intended to aid in understanding the embodiments and are to be construed as being without limitation to such specifically recited examples and conditions. As a result, the embodiments are not limited to any of the examples described below.

Figure 1:
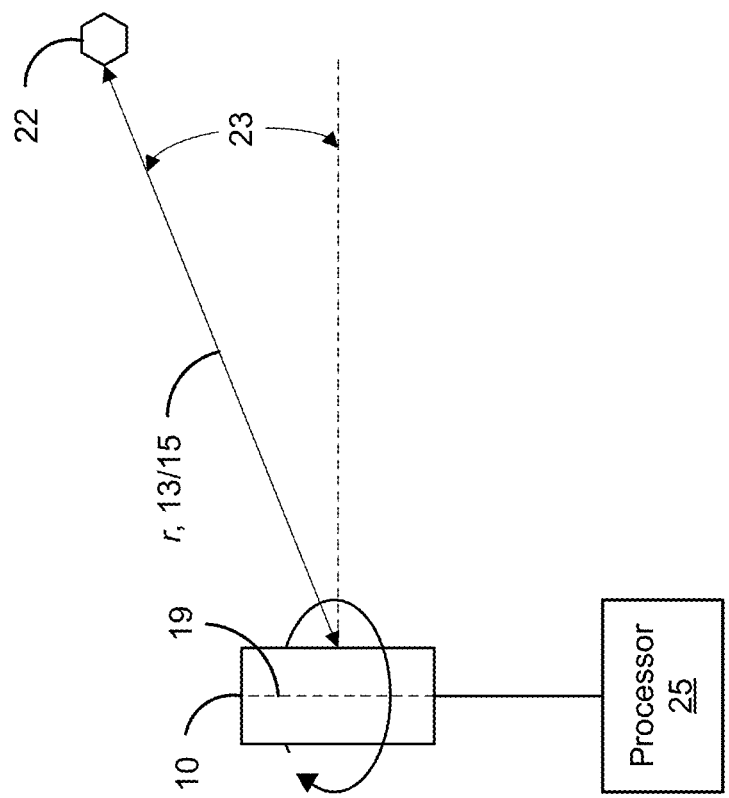
FIG. 1 is a block diagram of an exemplary Lidar system.

FIG. 1 is a block diagram of an exemplary Lidar system 10. In this embodiment the Lidar system 10 comprises a laser that is operable to generate laser light 13. A transmitter of the Lidar system 10 directs the laser light 13 to a target 22, and a receiver of the Lidar system 10 receives at least a portion of the laser light 15 that is reflected and/or backscattered from the target 22.

All or a portion of the Lidar system 10 is operable to rotate about an axis 19. For example, the transmitter and receiver of the Lidar system 10 may rotate about the physical axis 19 at the same rate to transmit the laser light 13 to the target 22, and to receive the reflected/backscattered laser light 15 from the target 22. The rotational speed (i.e., the angular velocity) of the transmitter and receiver portions of the Lidar system 10 may be selected as a matter of design choice based on, for example, desired range resolution of the targets, intensity of the laser light, and the like.

The transmitter and receiver components (shown and described in greater detail below) of the Lidar system 10 and the other embodiments disclosed herein are configured in a bistatic arrangement. A bistatic arrangement generally refers to an optical arrangement in which the transmit and receive paths in an optical system are different. In this regard, the path of the laser light 13 transmitted to the target 22 may differ from the path of the laser light 15 received from the target 22. And, the rotations of the transmitter and the receiver portions of the Lidar system 10 may cause an angular displacement in a detector portion of the Lidar system 10 that may be used to detect a range r to the target 22 and an angle 23 of the target 22 from the Lidar system 10. For example, the processor 25 may determine a range r to the target 22 and an angle 23 of the target 22 from the Lidar system 10 by using an angular displacement between the path of the laser light 15 and the receiver that arises from an angular velocity of the transmitter and receiver.

In some embodiments, the bistatic arrangement may have the transmitter and receiver components configured to rotate on separate axes aligned in the same direction. For example, a transmitter of the Lidar system 10 may be configured to rotate about an axis at a particular angular velocity. And, a receiver the Lidar system 10 may be configured to independently rotate about another axis that is either in line with or parallel to the axis of rotation of the transmitter. In such embodiments, the receiver and the transmitter may be synchronized to rotate at the same rotational rates. As used herein, the term "axis" refers to one or more axes of rotation aligned in the same direction.

Figure 2:
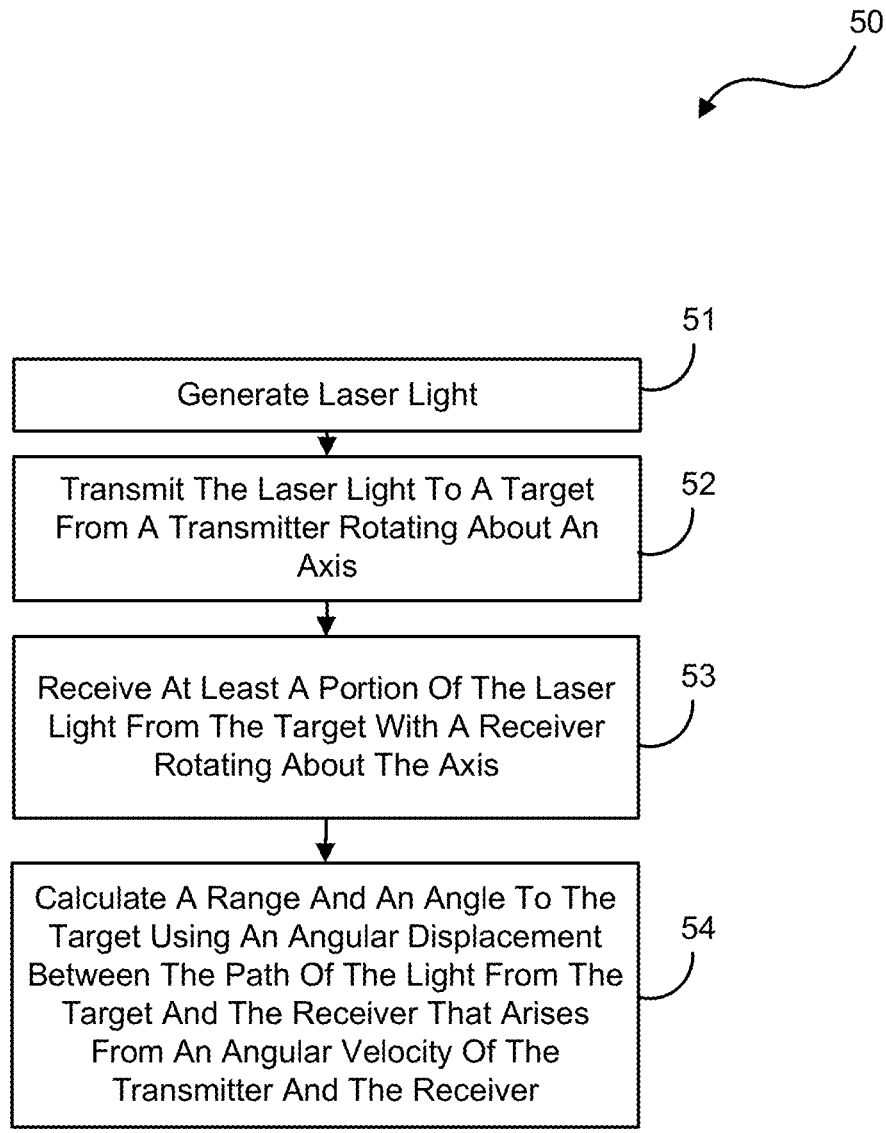
FIG. 2 is a flowchart of an exemplary process of the Lidar system of FIG. 1.

Although illustrated with a single target 22, the Lidar system 10 may detect a plurality of targets 22 at various ranges and angles from the Lidar system 10. For example, multiple targets 22 may surround the Lidar system 10. Thus, as the Lidar system 10 rotates around the axis 19, the Lidar system 10 may transmit laser light 13 to multiple targets 22 and correspondingly receive laser light 15 from those targets. Other exemplary embodiments are shown and described in greater detail below. Turning now to FIG. 2 is a flowchart of an exemplary process 50 of the Lidar system 10.

In FIG. 2, the process 50 initiates with a laser of the Lidar system 10 generating laser light, in the process element 51. A motor of the Lidar system 10 may be operable to rotate transmit and receive optics about an axis 19 (e.g., either separately or together). Thus, the Lidar system 10 may transmit the laser light 13 to a target 22 from a transmitter of the Lidar system 10 while rotating about the axis 19, in the process element 52. Similarly, the Lidar system 10 may receive at least a portion of the laser light 15 from the target 22 with a receiver rotating about the axis 19, in the process element 53. An imaging system may be configured with the Lidar system 10 to capture the received laser light 15 from the target 22. And, the processor 25, being communicatively coupled to the imaging system, may calculate a range r and an angle 23 to the target 22, in the process element 54, using an angular displacement between the path of laser light 15 and the receiver that arises from an angular velocity of the transmitter and the receiver rotating about the axis 19.

Figure 3:
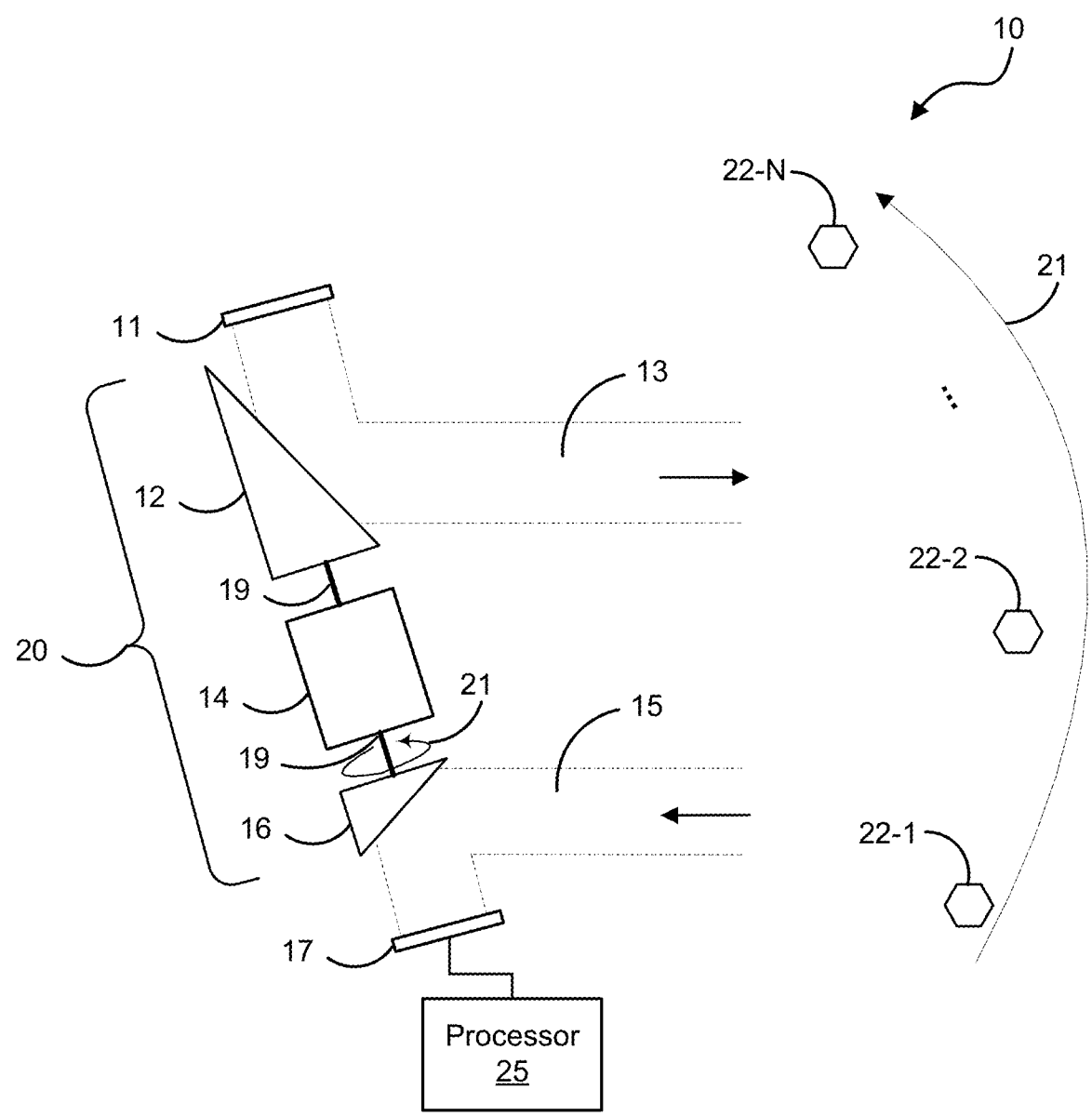
FIG. 3 is a block diagram of an exemplary embodiment of the Lidar system of FIG. 1.

FIG. 3 is another block diagram of an exemplary Lidar system 10. The Lidar system 10 is illustrated in a basic configuration with a laser 11, an imaging system or device 17, a rotating bistatic optical arrangement 20, and a processor 25. The rotating bistatic optical arrangement 20, in this embodiment, comprises monogon reflective elements 12 and 16 (e.g., monogon mirrors) that rotate about an axis 19 (e.g., as indicated by the circular rotation arrow 21). A motor 14 may rotate the bistatic optical arrangement 20 about the axis 19.

As the optical arrangement 20 rotates about the axis 19, the laser 11 may transmit laser light 13 towards one or more targets (e.g., targets 22-1-22-N, where "N" is an integer greater than "1" and not necessarily equal to any other "N" reference designated herein). For example, the laser 11 may transmit laser light 13 to the rotating reflective element 12 such that the laser light 13 rotatably scans according to the rotational velocity of the optical arrangement 20 provided by the motor 14. The laser light 13 may thus strike various targets 22 (e.g., hard targets and/or distributed scatterers) in the scan pattern.

Upon striking these targets 22, at least a portion of the laser light (i.e., the laser light 15) may be reflected and/or backscattered back to the optical arrangement 20. The laser light 15 reflects off the rotating optical element 16 to the imaging system 17 such that the processor 25 may determine a range and an angle of the targets 22, for example, by using an angular displacement between the reflective element 12 (e.g., the transmitter) and the path of laser light 15 at the reflective element 16 (e.g., the receiver) that arises from an angular velocity of the reflective element 16 during the time that the laser light traverses the paths of the laser light 13 and 15. In some embodiments, the angular displacement is commensurate with the angular velocity of the optical arrangement 20. Because the reflective element 12 and reflective element 16 rotate at the same rate, the angular displacements are measured at the imaging system 17 in directions that are relative to the angles of rotating optical element 13 resulting in illumination of the targets 22

In some embodiments, the optical arrangement 20 may include a balancing component. For example, as the reflective elements 12 and 16 may comprise different monogonal shapes, volumes, and/or materials, the reflective elements 12 and 16 may cause the optical arrangement 20 to become unbalanced when rotating about an axis, such as the axis 19. Accordingly, the motor 14 and/or the optical arrangement 20 may be configured with balancing mechanisms and/or devices that cause the rotation of the optical arrangement 20 to be substantially uniform. In some embodiments, the optical arrangement 20 may be configured with a single body that implements the reflective elements 12 and 16. In such an embodiment, the balancing component(s) may be configured within the body of the optical arrangement 20, and the optical arrangement 20 may be rotated via a perimeter driven motor. For example, the motor 14 may be configured with a fixed stator that surrounds the optical arrangement 20 in a band-like manner. When power is applied to the stator, the optical arrangement 20 rotates about the axis 19. Examples of such a motor include those developed by ThinGap, Inc. of 4035 Via Pescador Camarillo, Calif. 93012. The reflective elements 12 and 16 may have material removed from their interiors to assist in balancing and reducing forces holding the reflective elements 12 and 16 to a common shaft rotating about the axis 19.

The following may provide more insight as to how the range to a target may be calculated using the reflective monogons shown and described herein. For the case where a receiving monogon (e.g., the reflective element 16) and a transmitting monogon (e.g., the reflective element 12) have reflective surfaces that are at right angles to each other and the centers of the monogon reflecting surfaces are separated by a distance B along their common rotating axis (e.g., the axis 19), the following can be defined: $\alpha$ is the angle that the transmit scanning reflector makes with its fast scanning axis (e.g., the axis 19); $\omega$ is the angular rotation rate that both the transmitter and receiver scanning reflectors make about their common fast scanning axis; f is the effective focal length of the receiver in the imaging system; R is the range to a target in the positive direction along the x-axis; and $\delta$ is the angular rotation made by the receiver reflector about the fast scanning axis during the time of flight of laser light from the transmit scanner to the target and back to the receiver scanner, which is $$\delta = \frac{R\left(1+\sqrt{1+(B/R)^2}\right)\omega}{c} \approx \left(\frac{2R\omega}{c} + \frac{B^2\omega}{2Rc}\right) \approx \frac{2R\omega}{c}.$$

In an idealized system, with perfect imaging, the light reflected from the target is generally centered at the image plane of the receiver with (x,y) coordinates as follows:

$$x_{im} = -f\sin(2\alpha) \quad \text{Eq. 1}$$

$$\frac{[B\cos(\delta) + R(1-\cos(\delta)(\sin^2(\alpha) + \cos^2(\alpha)(2\cos(\delta)-1)))]}{B\cos(2\alpha) + R[\cos^2(2\alpha) + \sin^2(2\alpha)\cos(\delta)]}; \text{and}$$

$$y_{im} = f\sin(2\alpha)\frac{[-B + R(\sin^2(\alpha) + \cos^2(\alpha)(2\cos(\delta)-1))]}{B\cos(2\alpha) + R[\cos^2(2\alpha) + \sin^2(2\alpha)\cos(\delta)]}\sin(\delta). \quad \text{Eq. 2}$$

As a special example, when $\alpha = \pi/4$ and the laser light is scanned in a plane (i.e., not a cone), these expressions may be simplified as follows:

$$x_{im} = -f\left[\frac{B}{R} + \sin(\delta)\tan(\delta)\right]; \text{and} \quad \text{Eq. 3}$$

$$y_{im} = f\left[-\frac{B}{R}\tan(\delta) + \sin(\delta)\right] \quad \text{Eq. 4}$$

In the limit of a relatively small $\delta \approx 2R\omega/c$ and an $$\alpha = \frac{\pi}{4}:$$

$$x_{im} \approx -f\left[\frac{B}{R} + \left(\frac{2\omega}{c}\right)^2 R^2\right]; \text{and} \quad \text{Eq. 5}$$

$$y_{im} \approx f\left(\frac{2\omega}{c}\right)[-B+R]. \quad \text{Eq. 6}$$

Generally, since R>>B, these expressions can be further approximated as:

$$y_{im} \approx f\left(\frac{2\omega}{c}\right)R; \text{and} \quad \text{Eq. 7}$$

$$x_{im} \approx -\frac{fB}{R} - \frac{y_{im}^2}{f} \quad \text{Eq. 8}$$

Thus, the parallax term in the x-position $$\left(-\frac{fB}{R}\right)$$

is independent of the rotational angular frequency $\omega$, and is slightly corrected by a quadratic term in the displacement in the vertical position ($y_{im}$). The position of the image in the y-direction ($y_{im}$) is approximately proportional to both the range R and $\omega$. The $$\left(-\frac{fB}{R}\right)$$

term has the effect of taking the target images off the y-axis when the range is small (e.g., when the target is relatively close).

Generally, however, targets are placed along the x-axis as a matter of convenience, and the x-axis can always be chosen to be along the direction of any target with the y-axis being appropriately rotated. If a derotator (shown and described below) is used, the derotator may be configured to roughly align the target images to the y-axis and place the target images along the range direction in the sensor image.

Generally, parallax reduces sensitivity to near-range signals which are out of focus and can "blind" the system to other targets. However, it may be important to understand how the parallax effect can either aid or harm measurements.

Figure 4:
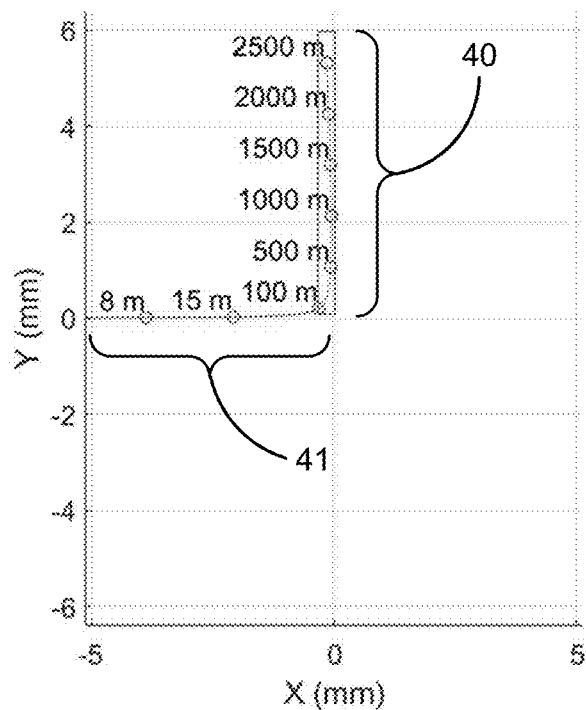
FIG. 4 illustrates positions in an image plane resulting from detected targets.

FIG. 4 shows the positions, within an image plane, resulting from targets aligned in the x-axis at ranges between 8 m and 2,500 m. For the purpose of this example, a 250 Hz rotation rate is used with a 6 inch bistatic separation between the centers of the transmitter and receiver monogons 12 and 16, respectively. The monogons are affixed to opposite sides of a shared shaft. And, the imaging system 17 is may be configured with an 8" focal length.

The illustrated image plane corresponds to the sensor size from a sensor having 20 micron pixels with 640 pixels in the vertical y direction and 512 pixels in the horizontal x direction. At near ranges (e.g., less than about 121 m), parallax dominates and the target images are formed roughly along the x-axis at positions that are largely independent of the rotational speed of the transmitter and receiver.

The image shows target images at 8 m, 15 m, and 100 m being in this regime. At ranges that are further, the linear time-of flight ranging regime 40 illustrates where the distance of the target image from the center of the image plane is approximately proportional to both the range to the target and the rotational rate of the transmitter 12 and the receiver 16. This provides the ranging mechanism where angular rotation from the receiver during the travel times to the target and back results in a displacement of the illuminated target image.

One advantage of the bistatic CW Lidar system is the behavior of near range targets. For a monostatic system, near range targets may be highly out of focus and tend to result in very large and saturated images near the center of the image plane that limits the ability to see any other targets. For a bistatic system, the displacement between the transmit and receive apertures results in parallax and the image of near range targets has a position at the image plane that is almost entirely due to parallax. For near ranges, parallax moves the target image relatively far from the center of the image plane. If a derotator is used, or alternatively if an appropriate rotating shutter is used, near range targets will generally not be seen and will not affect the ability of the sensor to see targets at further ranges.

Even if a 2D camera is used without any rotating shutter, the parallax imaging of near range reflections can be designed to produce a background far enough away from the center of the image plane to not affect signals over an operational range sensitivity of the Lidar system. Additionally, by changing the rotation rate of the scanner (e.g., the motor 14), the ranging measurement from laser time of flight can be dilated or contracted, while the parallax dominated ranging 41 is largely independent of the rotation rate of the scanner. The near range and highly out of focus target images can be made to appear relatively far outside the region within the sensor, whereas adequately in-focus images may be made by designing an appropriate bistatic separation and rotation rate.

Figure 5:
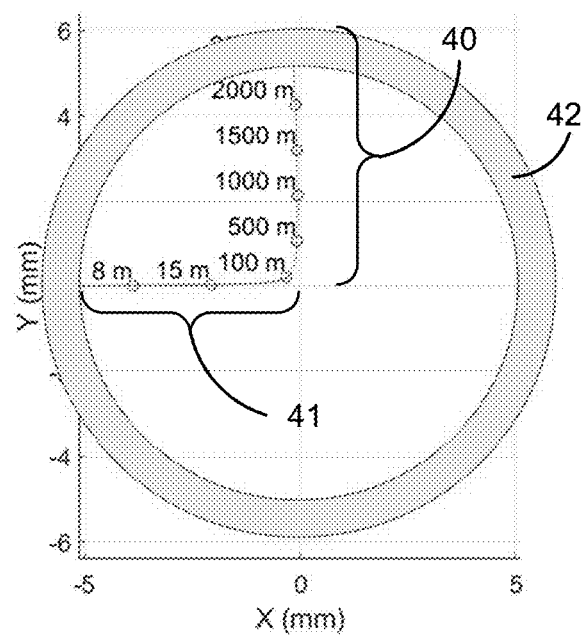
FIG. 5 illustrates a "dead-zone" that could occur on a 2D imager without the use of a derotator or a spinning shutter.

FIG. 5 shows a dead-zone that could occur on a 2D imager without the use of the derotator or a spinning shutter. Near range targets could result in substantial amount of light in a dead-zone band 42 that is largely displaced from the center of the image but would not affect targets at ranges between 8 m and 2 km, in this example. Because sensors may be configured on platforms with other structures interfering with the delivery to distant targets, consideration of near range signals may be important to consider.

Note that in the 2D imager example (e.g., without a derotator), range angle values may be double valued and both a parallax and time of flight sensing mode may be used simultaneously. A target that is at +8 m in the x-direction would generally appear approximately at the same distance as a target at 1.8 km in the x-direction. While the nearer range target may be much brighter than the more distant target, the ambiguity could also be resolved by varying the rotation speed of the transmitters and receivers. A long range target would move radially in response to the different rotation rate, but the near range target would have negligible position changes at the image plane. Both the parallax and time-of-flight measurement modes could be used on the system. But, parallax measurement methods with a compact system having a limited separation between the receiver and transmitter may only be effective in making range measurements in the near range. Parallax measurement methods may be less useful in longer-range measurements utilizing the receiver rotation during laser light time of flight to the target and back.

In whatever the configuration, the Lidar systems herein include any device, system, software, or combination thereof comprising a bistatic optical arrangement that rotates about an axis to transmit laser light to one or more targets, and to receive resulting reflected and/or backscattered laser light from the one or more targets to determine a range and an angle of the one or more targets based on the angular displacement between the transmitter portion of the optical arrangement and the receiver portion of the optical arrangement. In other words, both the transmitter portion and the receiver portion of the optical arrangement 20 rotate about a physical axis, either individually or as part of a single unit, to transmit and receive laser light for determining the range and angle of a target based on the angular displacement between the path of laser light 15 and the receiver resulting from the rotation of the receiver during the traversal of laser light from the transmitter to a target 22 and back to the receiver.

The laser 11 is any device, system, software, or combination thereof operable to generate laser light. Many of the embodiments shown and described herein may be particularly well-suited for performing Lidar analysis with continuous wave (CW) laser light. Accordingly, with many of the embodiments herein, the laser 11 may be configured to generate CW laser light. However, the embodiments are not intended to be limited to any particular form of laser light as, in some embodiments, the laser 11 may pulse laser light. The wavelength of the laser light may be selected as a matter of design choice. In some embodiments, the Lidar system 10 may comprise a plurality of lasers 11 that generate light at different wavelengths. For example, one laser may generate a first wavelength, a second laser may generate a second wavelength that differs from the first wavelength, a third laser may generate a third wavelength that differs from the first and second wavelength, and so on. Generally, the number of lasers 11 and their wavelengths may be selected as a matter of design choice.

The imaging system 17 is any device, system, software, or combination thereof operable to image the laser light 15 received by the reflective element 16. For example, the imaging system 17 may include one or more detectors configured in one-dimensional detector arrays and/or two-dimensional detector arrays. Examples of detector elements employed by the detectors may include camera pixels, photon counters, PIN diodes, Avalanche Photo Detectors (APDs), Single Photon Avalanche Detectors (SPADS), Complementary Metal Oxide Semiconductors (CMOS), Position Sensitive Detectors (PSDs), or the like. In some embodiments, the Lidar system 10 may include additional optical elements including focusing elements, diffraction gratings, transmissive scanners, and the like. Where multiple laser wavelengths are used as part of laser 11 or lasers 11, the imaging system 17 may include multiple arrays of detectors, each with different wavelength sensitivities. In some embodiments, dichroic mirrors, spectral filters, and/or polarization filters may be used to route light to multiple arrays of detectors.

The processor 25 is any device, system, software, or combination thereof operable to process signals from the imaging system 17 to determine a range and an angle of the target 22 based on the angular velocity of the reflective elements 12 and 16. One exemplary computing system operable to perform such processing is shown and described in FIG. 21 Examples of the target 22 include hard targets (e.g., planes, cars, people, and other objects) and soft targets (e.g., particulates, clouds, vapors, and/or other distributed volumetric scatterers).

Figure 6:
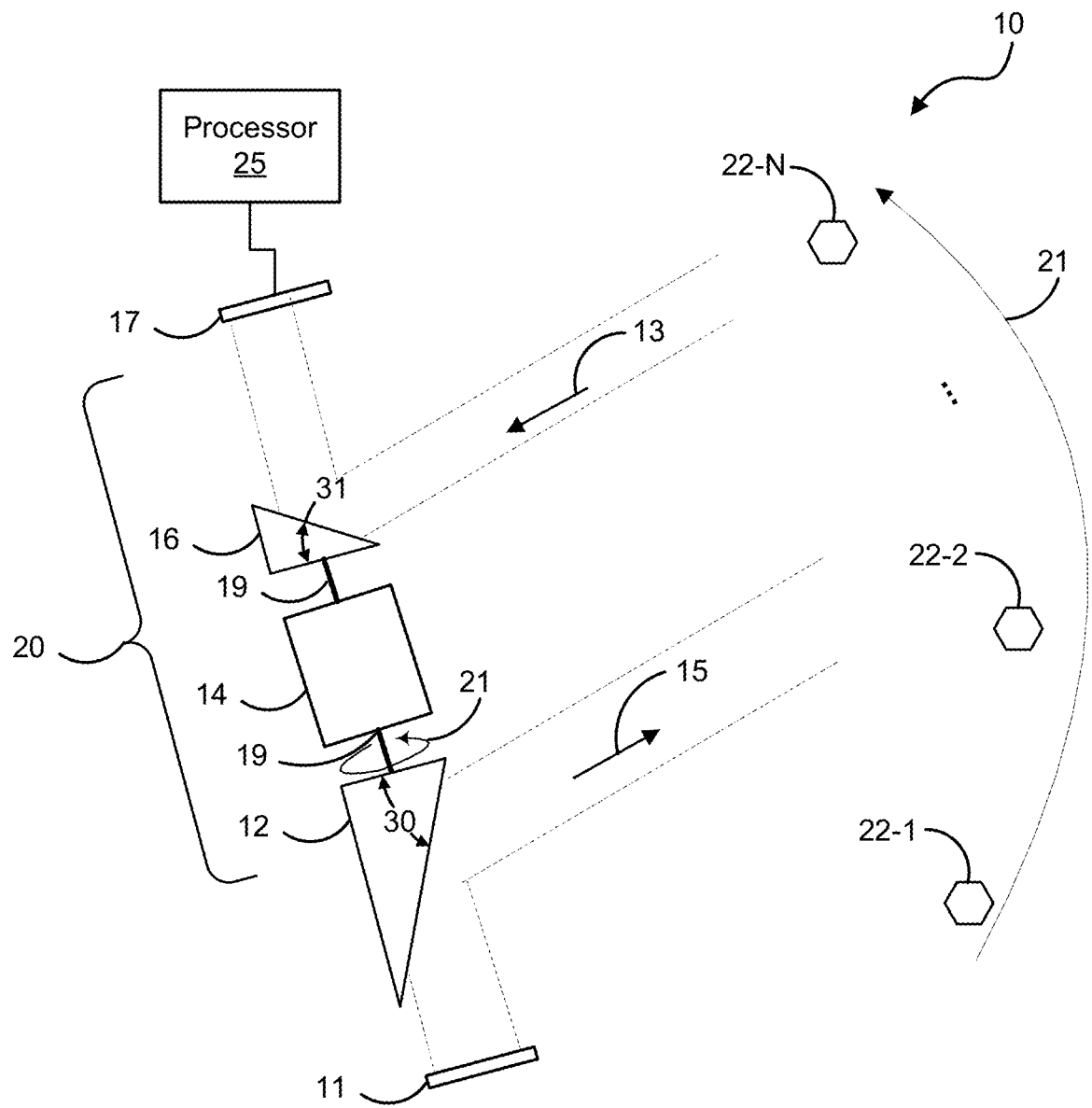
FIG. 6 is a block diagram of another exemplary embodiment of the Lidar system of FIG. 1.

It should be noted that the reflective elements 12 and 16, while both being configured as monogon reflective elements, may comprise shapes and angles of reflection that differ from one another. For example, the reflective element 16 is illustrated as a shorter, "stubbier" monogon with a shorter reflective surface, while the reflective element 12 is illustrated with a longer reflective surface due to its angle of reflection. Positioning of the reflective elements 12 and 16 may be determined as a matter of design choice. For example, the reflective elements 12 and 16 may be switched so as to provide different angular ranges of detection (e.g., for targets 22 at higher elevation angles with respect to the Lidar system 10). FIG. 6 illustrates such an embodiment. The selection of which monogon design parameters to use for the transmitter and the receiver is also a matter of design choice. For example a monogon with a larger diameter could be chosen to increase the amount of light received.

In FIG. 6, the shorter reflective element 16 is configured on top of the optical arrangement 20 and the larger reflective element 12 is configured on the bottom of the optical arrangement 20. Generally, the reflective elements 12 and 16 comprise angles of reflection 30 and 31 relative to axis of rotation 19, that when summed together, are equal to 90°. In some embodiments, the criteria is met with one reflective element (i.e., 12 or 16) surface making an angle that is less than 45° with the axis 19. Thus, the second reflective element (i.e., 16 or 12) would have a surface that makes an angle that is more than 45° with the axis 19, adding to 90° when summed together. Such a configuration of the optical arrangement 20 may be preferable to a configuration with both surface elements being normal as a 45° angle relative to the axis 19 to sense targets over a larger range of elevation angles due to the precession of the reflective elements 12 and 16.

It is also possible that one of the reflective surfaces may be rotated about the axis 19 so that the surface normal of the reflective elements 12 and 16 does not fall in the same plane as the axis 19. Such a design choice may be made to better align range images with radial directions at an image plane on the imaging system 17 for specific ranges of interest.

Figure 7:
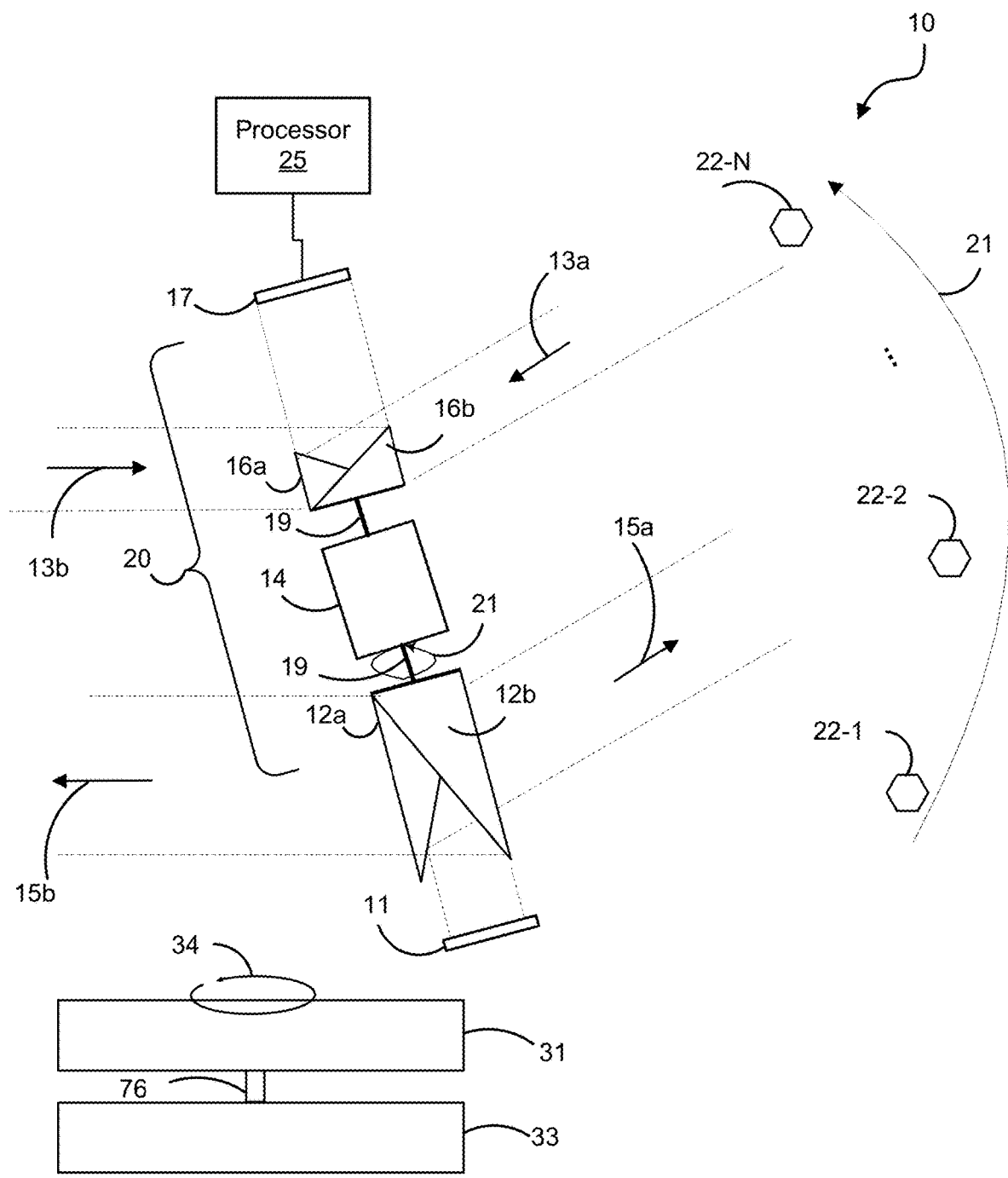
FIG. 7 is a block diagram of another exemplary embodiment of the Lidar system of FIG. 1 additionally illustrating conical precession scanning.

FIG. 7 illustrates an embodiment where the axis of rotation 19 precesses about a precession axis 34. In FIG. 7, the reflective element 12 is shown as 12a when rotated to one angle about the axis 19 with the laser light 15 directed along the path 15a. Likewise, the reflective element 12 is shown as 12b when rotated to another angle about the axis 19 with the laser light 15 directed along the path 15b. Similarly, the reflective element 16 is shown in two rotation configurations 16a and 16b, with resulting light paths 13a and 13b, respectively. Over the full rotation about the axis 19, the light paths 13 and 15 sweep out conical surfaces that are approximately identical but displaced along the axis 19. The light paths 13a and 15a illustrate the laser light 13 and 15 when directed at the highest elevation in the conical surface. Similarly, like the paths 13b and 15b illustrate the laser light 13 and 15 when directed at the lowest elevation in the conical surface.

In one embodiment, the optical arrangement 20 may be mounted about a rotating base 31, which may be rotated with respect to a platform 33 about an axis 76. By rotating the optical arrangement 20 at an angle 34 about the axis 76, the highest and lowest elevations of the conical scans (and the angles in between) may be directed in a large span of azimuthal angles. Generally, the rotation of the optical arrangement 20 about the axis 76 is considered a precession of the axis 19 and permits sensing of angles between the lowest elevation of the conical scan and the highest elevation of the scan. Rotation 34 about the axis 76 can be performed as a reciprocal motion (e.g., rotating clockwise and then counterclockwise) so as to avoid twisting of any electrical cables or fibers that may run between the optical arrangement 20 and the platform 33. Alternatively, the rotation 34 about the axis 76 may be continuous and electrical signals and power to the optical arrangement 20 may be either wireless or conducted through a slip ring to the platform 33. A slip ring is an electromechanical device that allows the transmission of power, electrical signals, and the like from a stationary component of a rotating structure. Additionally or alternatively, the rotation angle 34 for may be controlled by a processor to direct the sensor towards specific targets or regions.

Figure 8A:
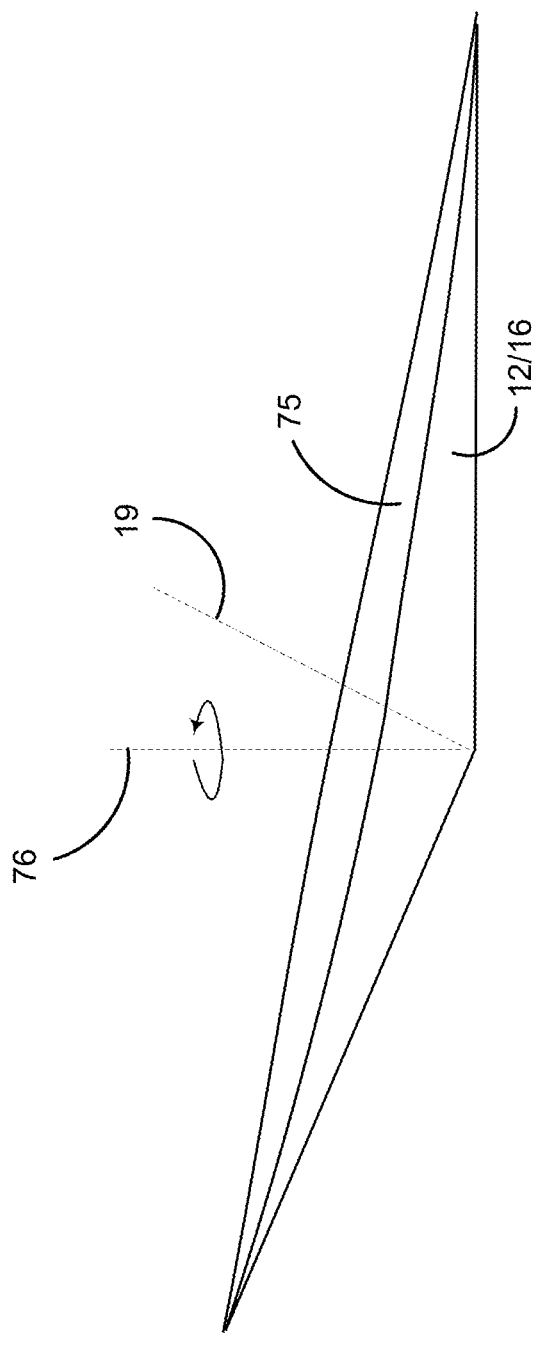
FIGS. 8A and 8B illustrate precession of exemplary reflective elements of a Lidar system.
Figure 8B:
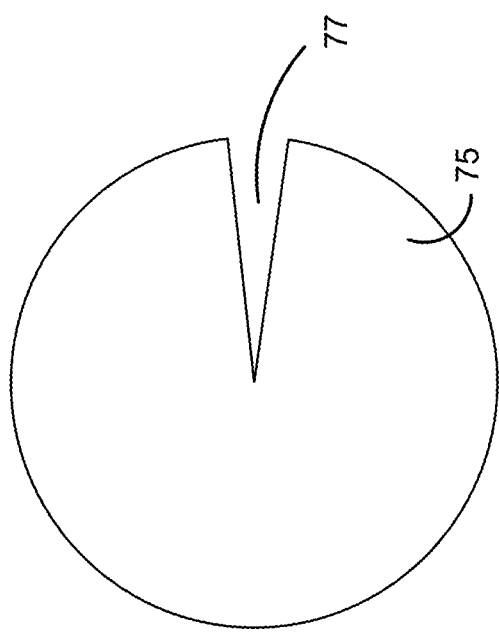

FIGS. 8A and 8B illustrate the precession of the reflective elements 12 and 16. The reflective element 12 scans the path of the laser light 15 over a conical surface 75. The precession of the axis 19 about an axis 76 results in the conical surface 75 scanning a range of elevations over most if not all azimuthal angles. Generally, rotation about the axis 76 is much slower than the rotation of the reflective elements 12 and 16 about the axis 19.

FIG. 8B is a downward view of the conical surface 75 made by a single 360 degree rotation of the reflective elements 12 and 16 about the axis 19. The gap 77 illustrated in FIG. 8B is generally attributable to the mounting mechanism for the optical arrangement 20, which may block the light path 13 during some angular segment of the 360 degree rotation. However, via precession of the axis 19 about the axis 76, the gap 77 may be filled in via processing if the gap is chosen to correspond to a mid-elevation in the conical scan. This can be achieved by placing support mounts for the optical arrangement 20 (e.g., "in front of the plane of the paper" or "behind the plane of the paper"). By rotating the axis 19 through an angle of 360 degrees about the axis 76, the elevation angles blocked by the support mounts will instead be accessed by the conical surface 75 on the side of the optical arrangement 20 that is opposite to the side with support mounts.

Although shown and described with respect to the reflective element 12 being the transmitter and the reflective element 16 being the receiver, the embodiment is not intended to be so limited. In some embodiments, such as those shown and described below, the transmitter portion of the Lidar system is implemented with the reflective element 16 of the optical arrangement 20 and the receiver portion of the Lidar system is implemented with the reflective element 12 of the optical arrangement 20. An example of such is shown and described in FIG. 9

Figure 9:
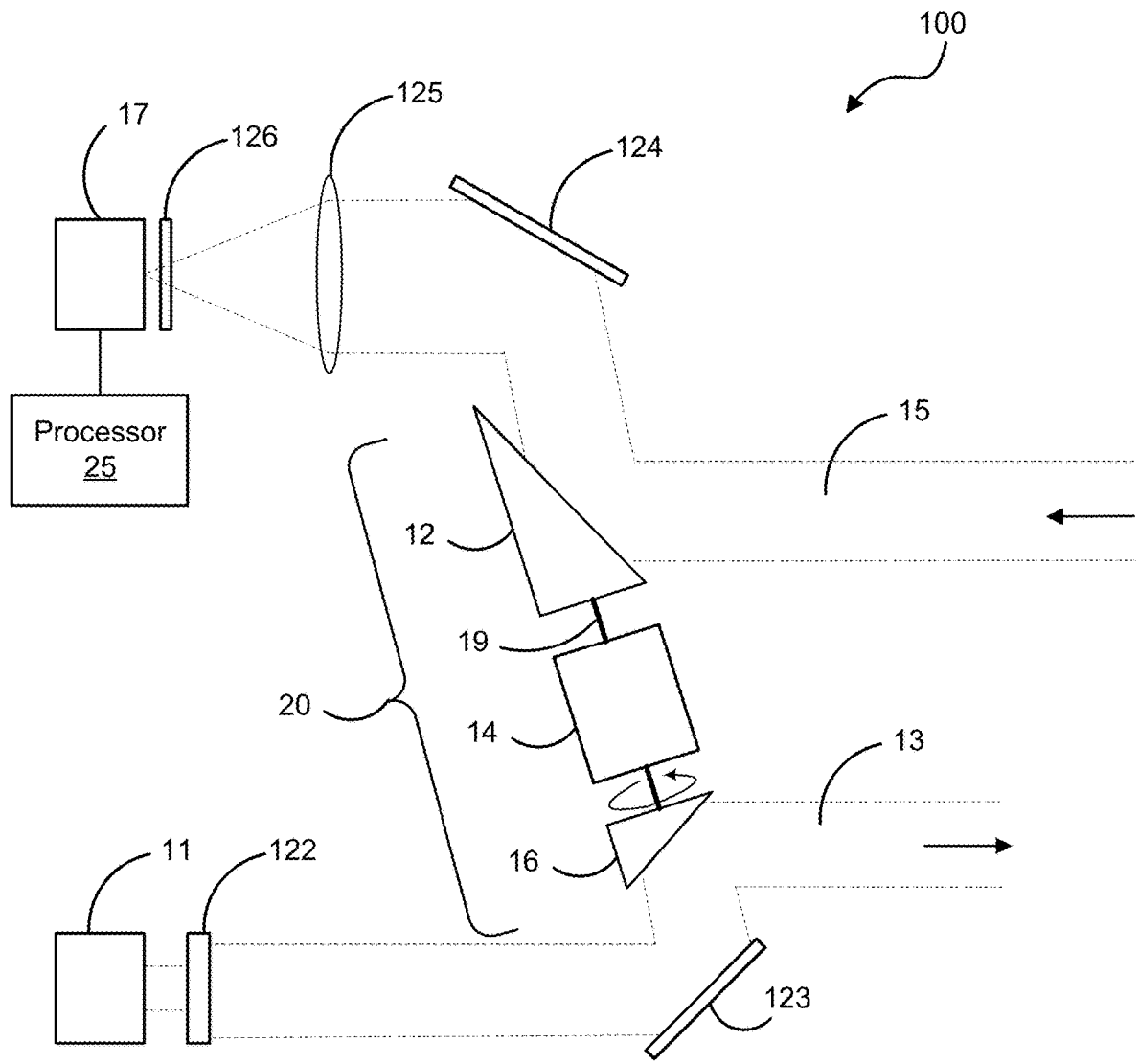
FIGS. 9 and 10 are block diagrams of other exemplary Lidar systems.

FIG. 9 is a block diagram of an exemplary Lidar system 100. In this embodiment, the transmitter and receiver portions of the Lidar system 100 have been switched with respect to the Lidar system 10 of FIGS. 3, 6, and 7. That is, the laser light is transmitted from the reflective element 16 of the optical arrangement 20 and the reflected/backscattered light from the target 22 is received by the reflective element 12 of the optical arrangement 20. Again, the reflective elements 12 and 16 may be switched to provide greater elevation detections.

In this embodiment, the Lidar system 100 includes at least one laser 11 that is operable to generate the laser light 13. The laser 11 may be optically coupled to a beam expander 122 that is operable to expand a beam of the laser light 13. Because of diffraction, an expanded beam is allowed to propagate with less divergence than a narrow beam and can provide greater precision in range and angle measurements as well as a smaller and more intense signal in the imaging system 17. Ultimately, divergence from the laser is a design choice in that greater divergence may allow precession scanning to complete continuous scans of large solid areas in less time. But it may also reduce signal to noise ratios (SNRs) of detections and reduce range and angle measurement precision.

The beam expanded laser light 13 may be propagated by a reflective element 123 that directs the laser light 13 to the reflective element 16 (e.g., the transmitter) for propagation to the target 22. The motor 14 rotates the reflective element 16 about the axis 19 such that the laser light 13 propagates in a circular pattern, as shown and described above. The reflective element 12 also rotating about the axis 19 at the same angular velocity as the reflective element 16 receives the laser light 15 that is reflected/backscattered from the target 22. The reflective element 12 may then propagate the laser light 15 to a stationary reflective element 124. The stationary reflective element 124 may, in turn, direct the laser light 15 to a focusing element 125. The focused laser light 15 may then be detected by the imaging system 17.

The Lidar system 100 may also include a gradient filter 126 (e.g., a radially dependent transmission gradient filter). In such an embodiment, the gradient filter 126 may be placed at an image plane of the imaging system 17 to reduce the light from near range targets so that gain can be increased without saturating a detector within the imaging system 17. That is, near range returns generally have more intense illumination. By filtering off the near range returns and increasing the gain on the imaging system 17, farther range targets can be observed.

The gradient filter 126 may be a static element near the imaging system 17. Once detected, the processor 25 may determine a range and an angle to the target 22 as shown and described above. Other filters in optical elements may be alternatively or additionally included along the optical path between the reflective element 12 and the detectors of the imaging system 17. For example, a spectral filter with a transmission band that is matched to the wavelengths of the laser 11 may be used to block background radiation from the sun and/or other external sources so as to minimize interference with the images formed within the imaging system 17. Polarizing filters may also be used to reduce background radiation sources.

Figure 10:
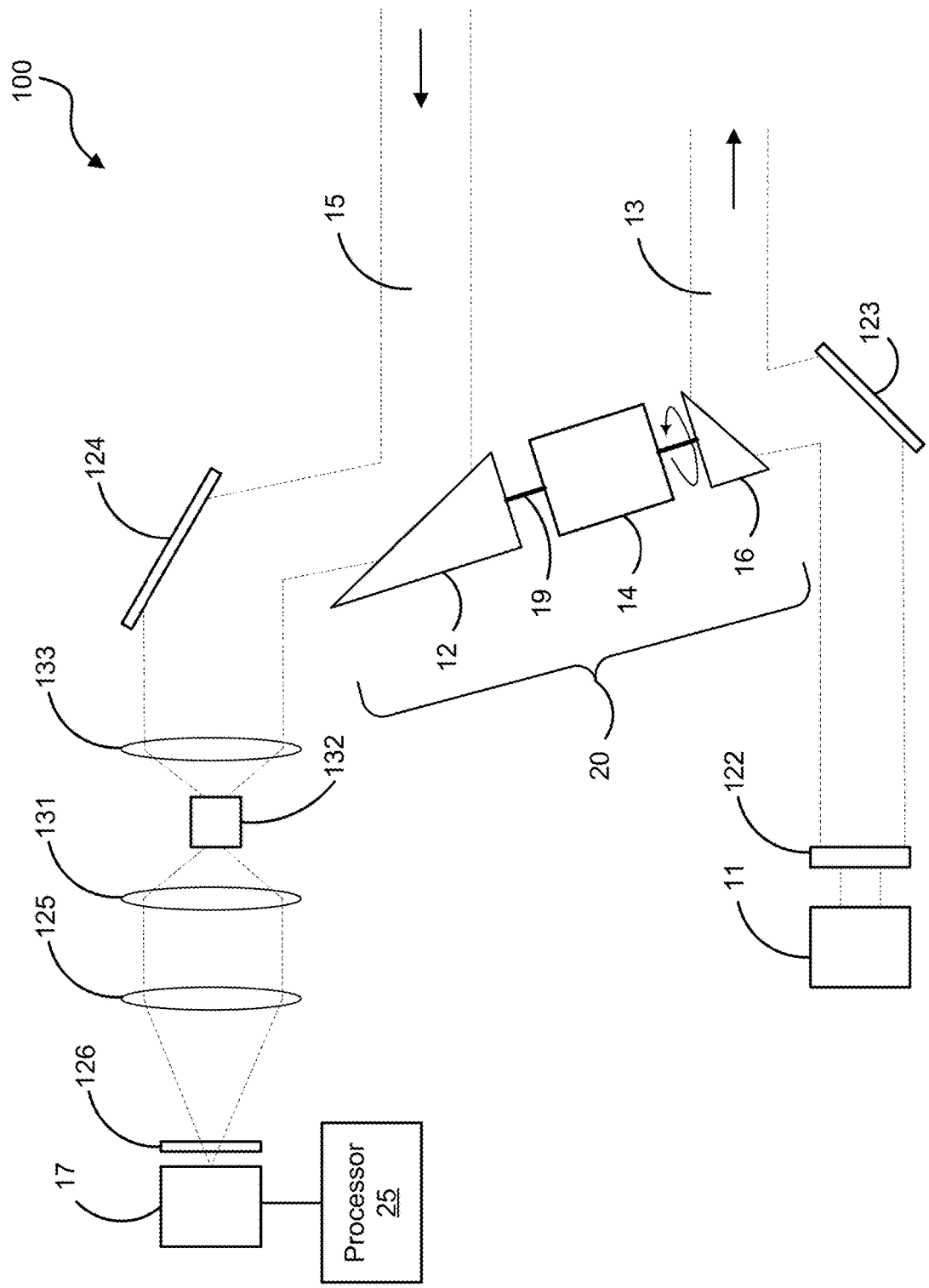

FIG. 10 illustrates a block diagram of an exemplary alternative embodiment of the Lidar system 100. In this embodiment, the Lidar system 100 receives the reflected/backscattered laser light 15 which is propagated through a focusing element 133 to an optical module 132. The optical module 132 may be configured as a derotator that inverts an image of the received laser light 15 such that detection of the laser light 15 may be received with a line scan camera with a one-dimensional array of photodetectors.

In a derotator embodiment, the optical module 132 may rotate at or about half the speed of the rotating reflective elements 12 and 16 so that range displacement line images for each of the laser light 15 are stationary. For example, a time dependent signal for each pixel in a detector plane of the imaging system 17 is generally needed to determine an angle of a received signal. But, a derotator may enable the use of detection pixels that are orthogonal to displacement line images. Alternatively, the optical module 132 may be configured as a shutter that rotates at the same speed as the reflective elements 12 and 16. In a shutter embodiment, the optical module 132 may thus capture substantially just the received laser light 15. Examples of derotators and shutters are shown and described in greater detail below.

The optical element 132 propagates the laser light 15 to an optical element 131 which collimates the laser light 15. The collimated laser light 15 is propagated to the focusing element 125 for detection by the imaging system 17 (e.g., through the gradient filter 126). The processor 25 then determines the range and angle of the target 22 with respect to the Lidar system 10. While the collimated space between the optical element 131 and the focusing element 125 may be a convenient location to insert a spectral filter, the optical element 131 and the focusing element 125 may be combined and replaced by any equivalent reimaging optical system which may include one or more (e.g., several) lenses as subcomponents.

Figure 11:
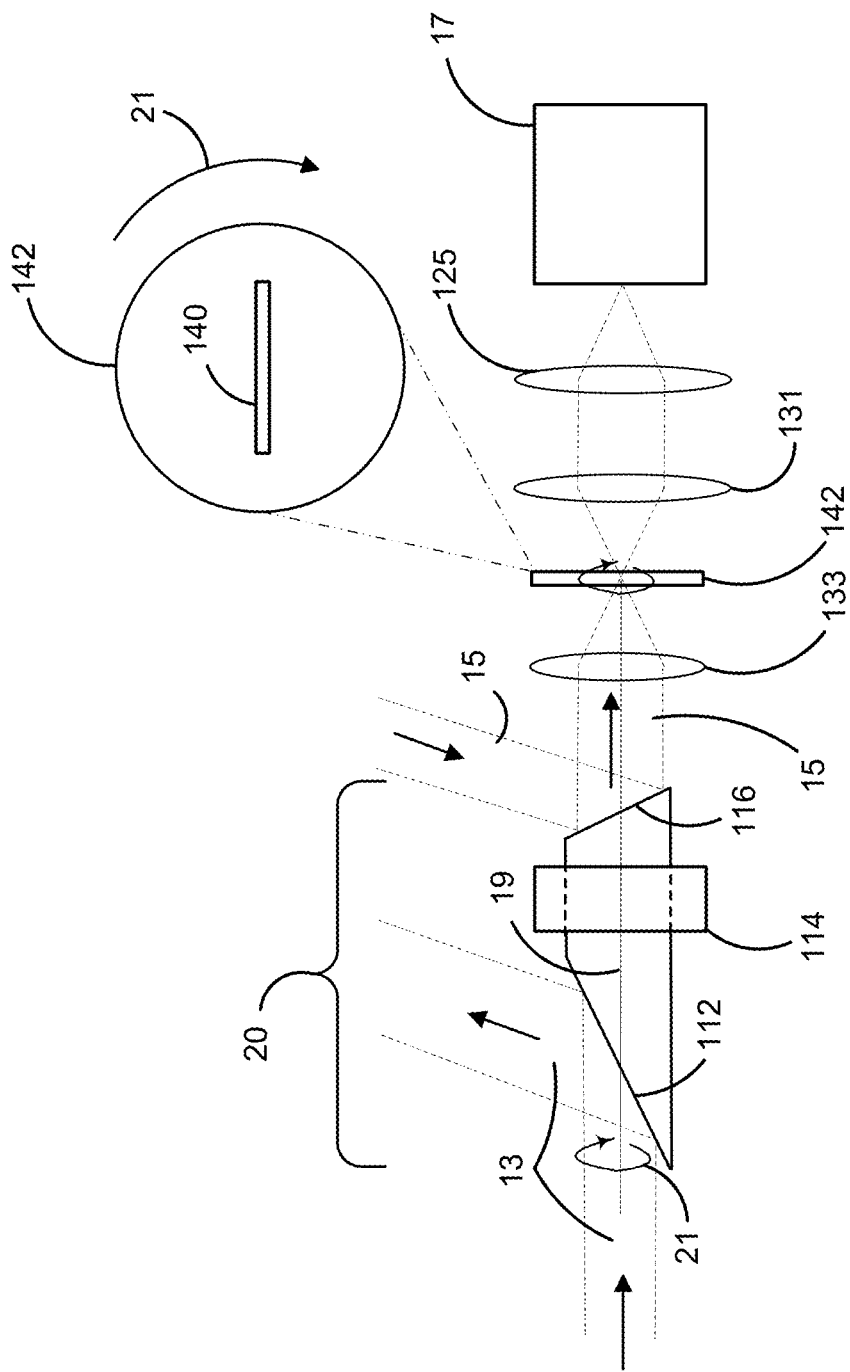
FIG. 11 is a block diagram of an exemplary optical arrangement with a rotating shutter for use with a Lidar system.

FIG. 11 illustrates a block diagram of the optical arrangement 20 and the imaging system 17. The optical arrangement 20, in this embodiment, is configured as a single unit comprising the reflective elements 112 and 116 and is rotated about the axis 19 via a perimeter driven motor 114, as described above. Thus, as the optical arrangement 20 rotates about the axis 19, the laser light 13 from a laser (not shown) reflects off the reflective element 112 in a circular pattern towards a plurality of targets 22. At least a portion of the laser light 15 returns from the targets 22 and is propagated through an optical element 133 (e.g., a lens) and onto a shutter 142.

In this embodiment, the optical element 133 and the shutter 142 rotate about the axis 19 at or about the same angular velocity as the optical arrangement 20. For example, the optical element 133 and the shutter 142 may be configured as part of the optical arrangement 20. Thus, when the optical arrangement 20 rotates, the shutter 142 may rotate at the same angular velocity. The shutter 142 may include a slit aperture 140 that is operable to block light from external radiation sources such as the sun. The shape of the slit may be designed to match a spatial displacement of illuminated target images expected over the distances in which the optical arrangement 20 is designed to be sensitive. For example, at sufficiently long ranges, illuminated target images should be primarily displaced from the center of rotation along a direction that is approximately perpendicular to the plane of reflection associated with the received light and the orientation of the reflective surface 116. The slit 140 passes light that could be received by an actively illuminated target while blocking other sources of light. The image that is formed at the rotation shutter may then be then reimaged by the optical elements 131 and 125 onto the imaging system 11.

Though the slit 140 is shown as a simple rectangular aperture, more complex shapes may be used to collect target images in nearer ranges and much further ranges where the displacement of the target image may be more complex. While the optical element 133 and the shutter 142 may be operable to rotate with the optical arrangement 20, the optical elements 131 and 125 may fixed in terms of motion (i.e., the optical elements 131 and 125 may not rotate within some embodiments).

Figure 12:
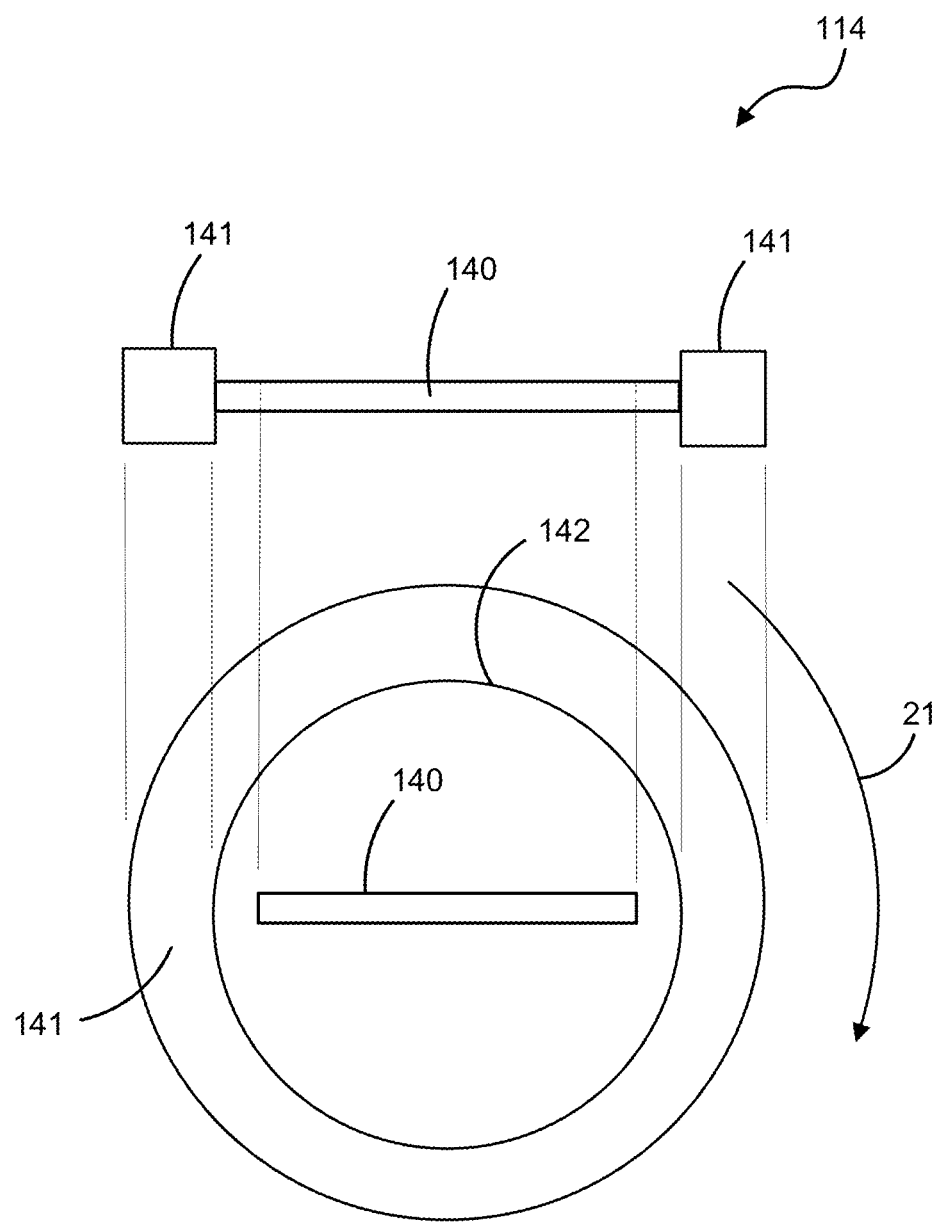
FIG. 12 illustrates top and front views of the rotating shutter of FIG. 11.

FIG. 12 illustrates side and overhead views of a perimeter driven motor 114 configured with the shutter 142. In this embodiment, the shutter 142 is configured within a perimeter driven motor 114 (e.g., as part of a rotor). The perimeter driven motor 114 comprises a stator 141 that directs the shutter 142 to rotate in a circular direction 21 at a particular angular velocity.

In some embodiments, the Lidar systems shown and described herein may comprise one or more perimeter driven motors 114. For example, the optical arrangement 20 of FIG. 11 may have its own perimeter driven motor 114 while the optical elements 133 and the shutter 142 may have their own perimeter driven motors 114 that are synchronized with the perimeter driven motor 114 of the optical arrangement 20 (e.g., so that the perimeter driven motors 114 rotate at the same angular velocity and with a controlled relative phase).

Figure 13:
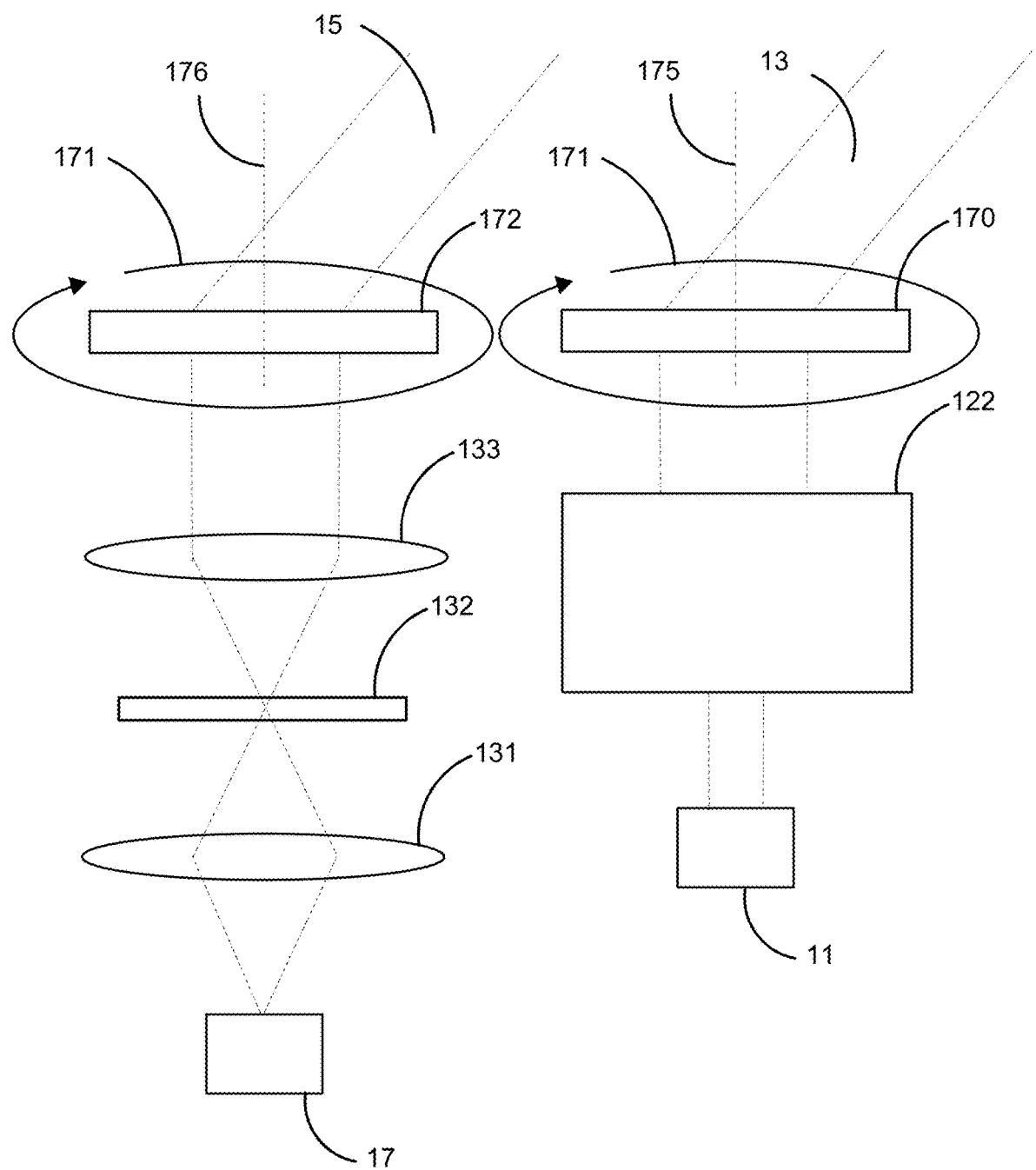
FIG. 13 is a block diagram of an exemplary optical arrangement for use with a Lidar system.

FIG. 13 illustrates a block diagram of an exemplary bistatic arrangement that may be implemented with any of the Lidar embodiments shown or described herein. In this embodiment, the transmitter portion and the receiver portion of a Lidar system are illustrated as two separate modules. The transmitter portion of the Lidar system comprises the laser 11, a beam expander 122, and a transmissive scanner 170. The transmissive scanner 170 may be operable to propagate laser light 13 from the beam expander 122 to targets 22 in a manner that diverges from the transmitter portion of the Lidar system. Thus, when the transmissive scanner 170 is rotated about an axis 175 at a first angular velocity 171, the transmitter portion of the Lidar system 100 propagates the laser light 13 in a conical pattern.

Similarly, the receiver portion of the Lidar system is configured with a transmissive scanner 172. In this embodiment, the receiver portion again comprises the imaging system 17, various optical elements 133 and 131, and an optical module 132. In the case of the rotating shutter 142 above, a line scan camera (i.e., a one-dimensional array of photodetectors) or a two-dimensional array of photodetectors may be used for detection of the received laser light 15.

In the case of an image derotator, a line scan camera is generally employed by the imaging system 17.

In this embodiment, the transmissive scanner 172 of the receiver portion of the Lidar system is operable to rotate about a separate axis 176 (i.e., aligned in the same direction as the axis 175) at the same rate of rotation 171 as the transmissive scanner 170 of the transmitter portion of the Lidar system. The receiver and transmitter do not share a common rotating axis but have independent rotating axes that are parallel (e.g., pointing in the same direction). Thus, this bistatic arrangement of transmitter and receiver may result in the receiver portion and the transmitter portion of the Lidar system rotating independently, albeit in a synchronized manner. For example, the transmissive scanner 170 of the transmitter portion of the Lidar system may be rotatably driven by its own motor 14. And, the transmissive scanner 172 of the receiver portion of the Lidar system may be rotatably driven by its own motor 14. In this regard, the processor 25 shown and described hereinabove may synchronize the rotation of the motors 14 such that transmissive scanner 170 and the transmissive scanner 172 rotate at the same angular velocity 171 and with a controlled relative phase angle. Alternatively, the transmitter portion and the receiver portion of the Lidar system may be configured as a single element as shown and described above. Still, in some embodiments, the transmitter portion and the receiver portion of the Lidar system may be mechanically coupled in such a way as to be driven by a single motor. Such mechanical couplings may include, for example, rolling contacts, gears, belts, or the like.

Figure 15:
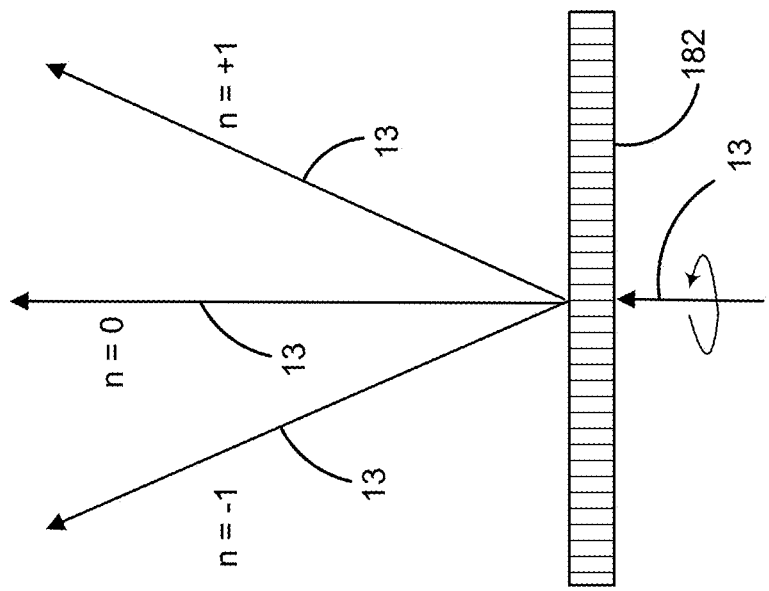
FIGS. 14 and 15 are block diagrams of exemplary transmissive optics for use with a Lidar system.
Figure 14:
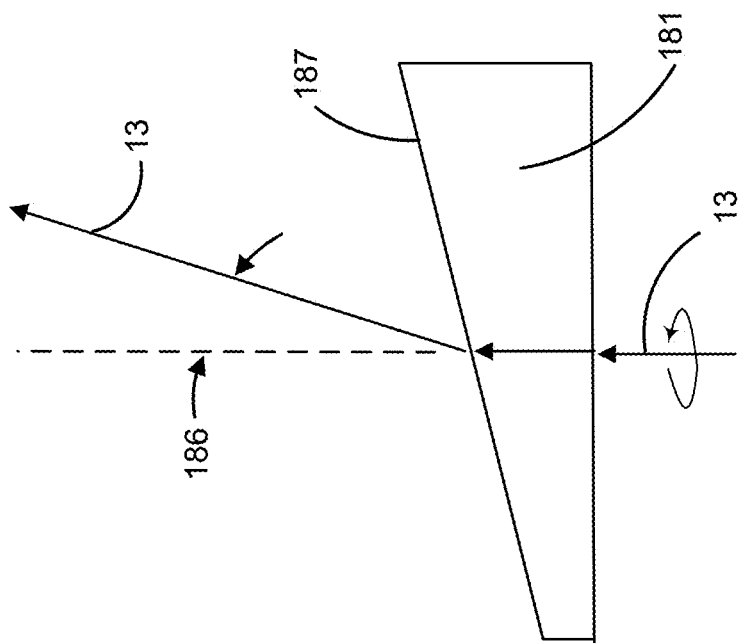

FIGS. 14 and 15 illustrate various optical elements that may be used in any of the optical arrangement 20 embodiments shown and described herein. For example, the reflective elements 112 and/or 116 of the optical arrangement 20 may be implemented with a refractive optical element 181 that causes the laser light to refract along a different path. In this regard, the transmitter may transmit the laser light 13 through the refractive element 181 where it is refracted at the surface 187 of the refractive element 181 at an angle 186 with respect to the incidence of the laser light 13 being transmitted. Thus, when a motor 14 rotates the refractive element 181, the laser light 13 is scanned in a conical pattern.

Although illustrated with the transmitter portion of the Lidar system, the refractive element 181 may also be operable with the receiver portion of the Lidar system. For example, the refractive element 181 may receive reflected and/or backscattered laser light from targets 22 via a conical scan of the refractive element 181 in the opposite manner as the laser light was transmitted.

In FIG. 15, the transmitter portion and/or the receiver portion of the Lidar system may be implemented with an optical element 182 which causes deflection of the laser light 13. For example, the optical element 182 may be implemented as a transmissive grating, a diffractive element, a blaze grating, or the like. FIG. 15 illustrates possible indices of refraction that may be obtained with the optical element 182. And, as the optical element 182 rotates about the axis, the laser light 13 propagates in a conical pattern towards the targets 22. Similarly, the Lidar system may employ the optical element 182 as part of a receiver portion of the Lidar system.

Figure 16:
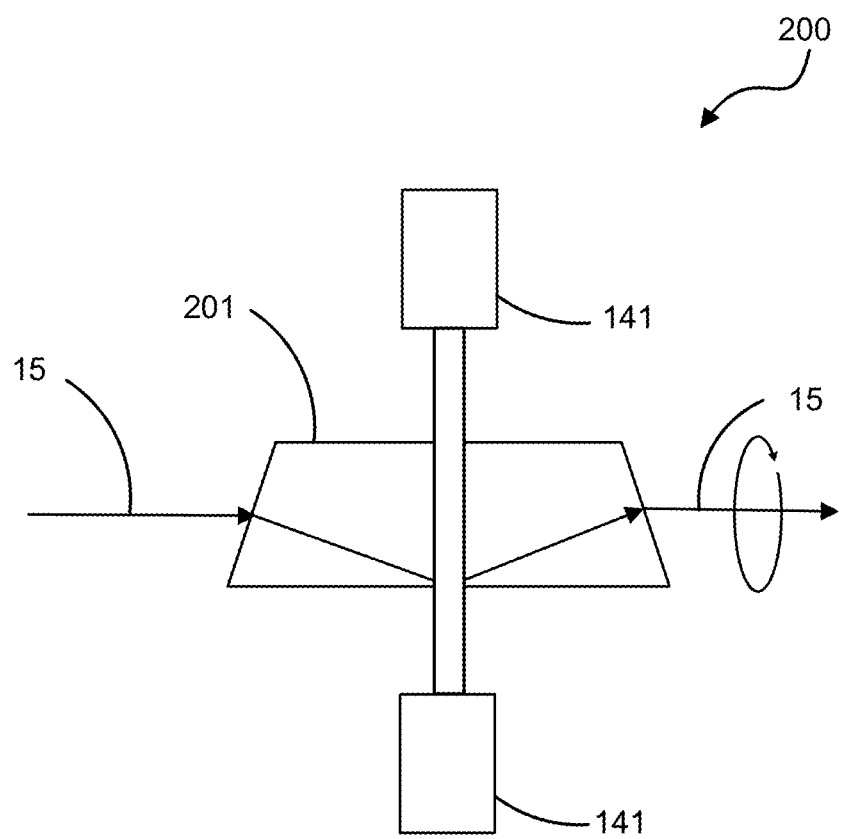
FIG. 16 is a block diagram of an exemplary transmissive image derotator.

FIG. 16 is a block diagram of an exemplary transmissive derotator 200 that may be implemented as the optical module 132 of FIG. 10. The derotator 200 is illustrated in a side view and, in this embodiment, is configured with a motor as described above (e.g., the motors 14 and 114). As with the other embodiments hereinabove, the derotator 200 may be implemented with the receiver portion of the Lidar system embodiments. The derotator 200, in this embodiment, is configured as a dove prism 201 that rotates about an axis as with the embodiments above. The derotator 200 is operable to rotate at an angular velocity that is generally half the angular velocity of the transmitter and receiver portions of the Lidar system. In this embodiment the derotator 200 is operable to invert the image of the received laser light 15 that is reflected and/or backscattered from the various targets 22. The inversion may occur about a line-of-inversion passing through the axis of rotation on the derotator assembly.

Figure 17:
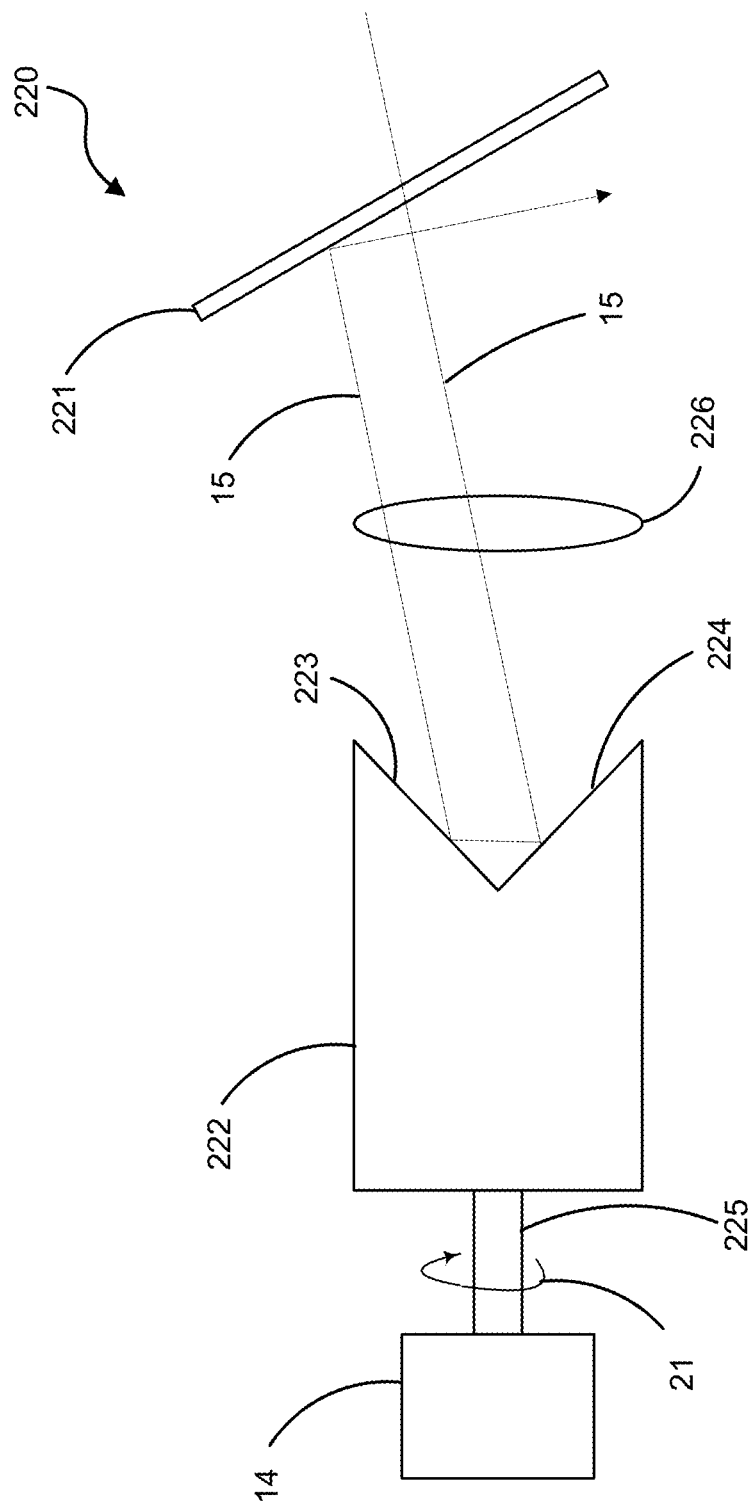
FIG. 17 is a block diagram of an exemplary reflective image derotator.

FIG. 17 is a block diagram of an exemplary reflective derotator 220. Again, the derotator 220 is operable to rotate at an angular velocity that is generally half the angular velocity of the transmitter and receiver portions of the Lidar system. In this embodiment, the derotator 220 is configured as a roof mirror 222 with reflective portions 223 and 224 being orthogonal to one another. In other words, the reflective portion 223 intersects the reflective portion 224 of the roof mirror 222 at a 90° angle. In this embodiment, the roof mirror 222 includes an axle 225 that is rotated about an axis that is aligned to the optical axis of the Lidar system.

Since the derotator 220 rotates at half the speed of the transmitter and receiver portions of the Lidar system, the derotator 220 has a controlled rotational phase relative to the rotational phase of the transmitter and the receiver. In many embodiments, the derotator 220 is rotated by a motor that is separate from the motor that drives the receiver and/or the transmitter. In such embodiments, a control system may be used to control the phase of the derotator 220 relative to the measured rotational phase of either the receiver or the transmitter. Alternatively, the rotational phase of the transmitter or the receiver may be controlled based on measurements of the rotational phase of the derotator 220. In some embodiments, the derotator 220 may be mechanically driven (e.g., via belts or gears) to maintain its rotational phase relative to the receiver and/or the transmitter.

In this embodiment, the laser light 15 is received by a stationary optical element 221 (e.g., via backscattering and/or reflection from various targets). The optical element 221 allows the laser light 15 to pass onto a focusing element 226. The focusing element 226 propagates the laser light 15 to the roof mirror 222, where the image is inverted and propagated back towards the optical element 221 which may then reflect laser light 15 to the imaging system 17. The roof mirror is centered so that the apex of the roof mirror (e.g., the line where the reflective portions 223 and 224 meet) crosses through the axis of rotation for axle 225. The optical element 221 may be a beam splitter or if the laser light 15 is polarized, a thin film polarizer. In the case where 221 is a thin film polarizer, a quarter wave plate may be inserted between the optical element 221 and the focusing element 223. A quarter wave plate may be fixed to rotate with the roof mirror 222 to compensate for polarization rotation resulting from reflections from the reflective portions 223 and 224

Figure 18:
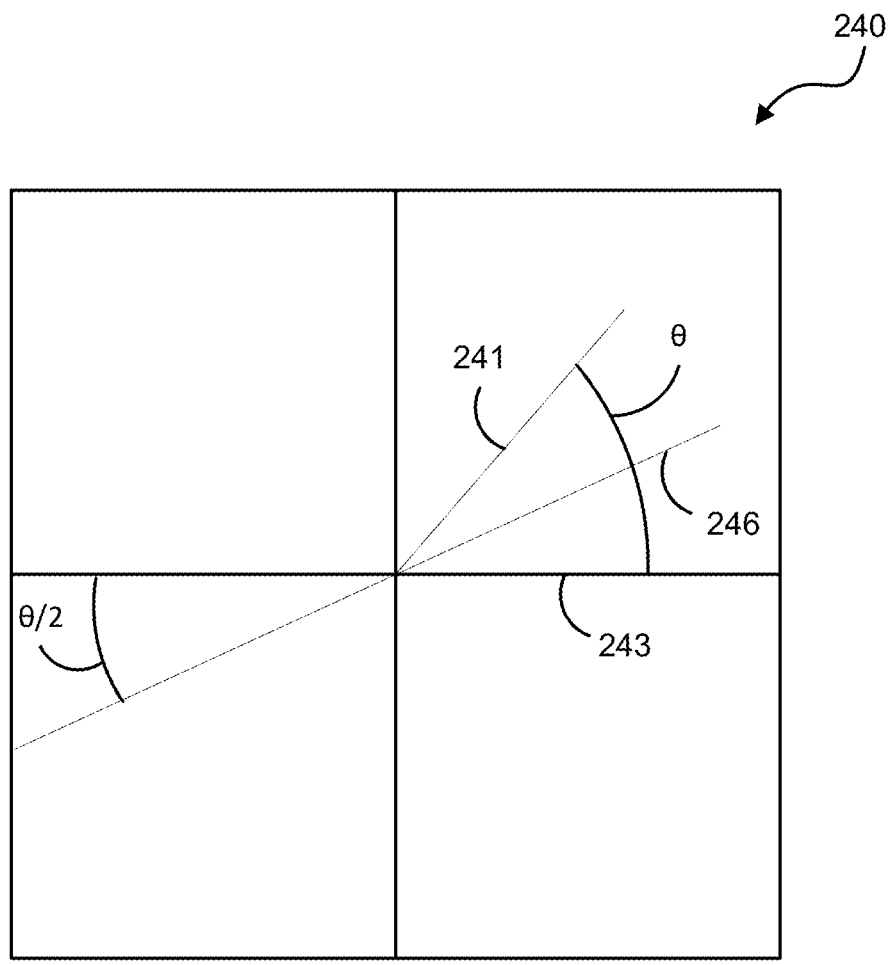
FIG. 18 illustrates exemplary image derotation maintaining range displacement along a constant path.

FIG. 18 illustrates image derotation as it maintains range displacement along a constant path. In this embodiment, a derotator, such as those described above, rotates a line of image inversion so as to derotate the range image 241 of the received laser light 15. Rotating the line of inversion 246 at half the rate of image rotation (i.e., $\theta/2$) maintains the range displacement direction along a constant direction and the inverted image is available on the line 243. So while illuminated target images may appear along a radial line 241 which rotates about the center of the image at the same rate of rotation as the transmitter and the receiver (e.g., ω=$\dot{\theta}$), the line of inversion 246 is rotated by the derotator at a rotation rate $\omega_{derotator}=\dot{\theta}/2$, so that after reimaging from the derotator, the target images lie along line 243 regardless of the scan angle θ.

FIGS. 19A and 19B generally describe how range to a target may be computed based on the angular velocity of the transmitter and receiver components of the Lidar system embodiments described herein. In FIG. 19A, the laser light would be transmitted to a target and received by a detector element 259-4 of a detector array having a plurality of detector elements 259-1-259-N (where the reference number "N" represents an integer greater than "1" and not necessarily equal to any other "N" reference number designated herein). This configuration serves as a reference for when the reflective element 16 is not rotating and the ray line 250a is approximately the same as the ray from the transmitter to the target. The image at detector 259-4 is a reference measurement of the angle used by the transmitter to illuminate the target.

However, as illustrated in FIG. 19B, when the scanning motor 14 rotates the reflective element 16 at a certain angular velocity, the received laser light impinges a different detector element 259-2 of the detector array (e.g., a different pixel), as illustrated with the ray line 251. The ray line 251 represents the light coming from the target that was illuminated at an earlier time but, due to the time delay from the speed of light, is entering the focusing element 258 along the ray line 251 instead of 250b. Thus, the ray line 251 indicates where the target will come to focus. The ray line 250b in FIG. 19B is a reference to show the angular displacement 252 due to rotation of the imaging system.

This angular displacement of the received laser light is attributable to the angular velocity of the scanner and can be calculated based on the angular displacement 252 of the ray lines 250B and 251 as follows:

$$\Delta\theta = \frac{2r_1}{c}\eta,$$

where Δθ is the angular displacement 252, $r_1$ is a range to the target, and η is the angular velocity of the scanner. And, if the receiver portion of the Lidar system has a focal length f, the rotation results in a spatial shift Δx=fΔθ in the position where the received laser light comes to focus on the image plane of the detector array 259-1-259-N. Thus, the displacement on the image plane is proportional to the range $r_1$ of the target as follows:

$$\left(\Delta x = \left(\frac{2f\eta}{c}\right)r_1\right).$$

More specifically, illumination at the image plane of the detector 259 has a displacement distance Δx (e.g., the distance between the detector elements 259-4 and 259-2) when the sensor is oriented at an angle $\theta_{sensor}$ corresponding to scatter at a location ($r_{scat}$, $\theta_{scat}$) in polar coordinates. This location $$(r_{scat}, \theta_{scat}) = \left(\frac{\Delta xc}{2f\eta}, \theta_{sensor} - \frac{\Delta x}{f}\right),$$

where f is the focal length of the focusing element 258, and $\theta_{sensor}$ is a rotated angle of the detector plane 259 due to the change in position of the reflective element 16 caused by the rotating scanning motor 14.

The range resolution for distant objects may be given as:

$$\Delta r_{res} \approx \frac{\Delta x_{PSF} \cdot c}{2f\eta},$$

where $\Delta x_{PSF}$ is the point spread function of the detector 259. Relatively high rotation rates η may be used to produce shorter distance range resolutions. For example, the range resolution for nearer objects may be degraded, unless the focal length of the receiver is modified to produce a sharp focus (e.g., via the focusing element 258). By rotating the scanning motor 14 at a faster rate, the need for modifying the focal length is reduced.

Signal returns arrive from the target and are reflected from the rotating reflective element 16 and imaged onto a focal plane of the detector 259. The signal returns are then processed by the processor 25. Using this configuration, the range-dependent radial displacements at the focal plane of the detector 259 rotate at the angular rate equal to the angular rate of the rotating reflective element 16, resulting in a scattering distribution similar to that illustrated in FIG. 20.

Figure 20:
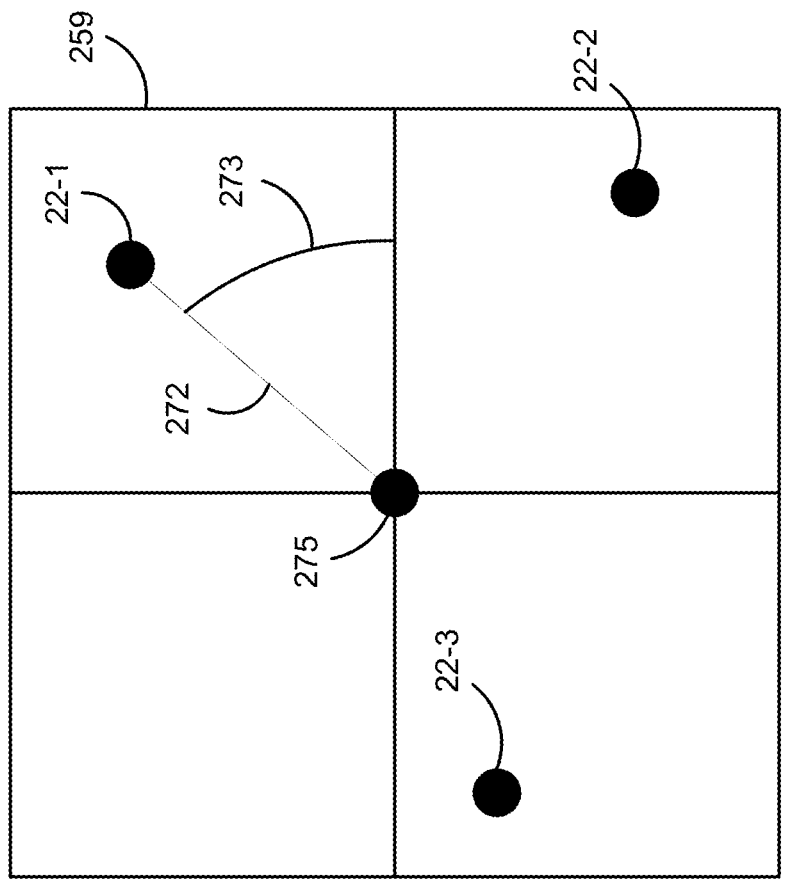

In the two-dimensional image of FIG. 20, the illumination displacement from a central location 275 in the plane of the detector 259 is proportional to the range of the scatterer (i.e., reflections of the laser light from the target). The polar angle of the illumination within the plane is roughly equal to the angle of the rotating reflective element 16 of the receiver when the detection was made. The polar angle for the scattering distribution is approximately equal to the angle of the sensor (i.e., the received laser light) when the detection is made, but it may include a relatively small correction. For example, a scatterer (target 22-1) positioned at a range and polar angle $r_{scat}$ and $\theta_{scat}$ would result in an image at polar coordinates, $$r_{det} = \left(\frac{2f\eta}{c}\right)r_{scat}$$

(reference number 272) and $$\theta_{det} = \theta_{scat} + \frac{r_{scat}\eta}{c}$$

(reference number 273) on the image plane of the detector 259. Since the factor $$\frac{r_{scat}\eta}{c}$$

is usually quite small, detected light at the image plane can be interpreted as a two-dimensional image of the laser scanned cone (e.g., or plane if the cone angle is π/2). Generally, the detector 259 may be configured to have integration times exceeding the single rotation period of the rotating mirror. In such a configuration, the pixels can accumulate signal from multiple rotations prior to signal digitization enabling an elegant analog method for signal averaging, such as those shown or described above.

Generally, background light collecting on the image plane of the detector 259 can be a relatively large source of noise that may limit the Lidar system's capability to sense weaker, more distant targets 22. However, the ability to sense these weaker, more distant targets 22 can be improved with a rotating reticle and/or a filter.

The present embodiments may be used for many applications and are not intended to be limited to detecting positions of hard targets. For example, using Differential Absorption Lidar (DiAL) techniques, the laser may be tuned on and off of an absorption line of a material or gas that is to be located. With collection of range dependent signal returns from multiple wavelengths with different absorptions for the detected species, the spatial distribution of the species within the sensed volume can be determined. The present embodiments provide a well suited sensing mechanism for range dependent Lidar returns for DiAL analysis and post processing. And, since atmospheric measurements typically do not require high resolution range measurements, spin rates for the scanning reflective element 16 can be made lower.

Moreover, DiAL sensing generally requires specialized narrow linewidth lasers that can be implemented with tunable diode lasers. But, conventional Lidar systems employ relatively high peak powers that cannot easily be attained with current semiconductor technology. This requisite combination of wavelength and peak power typically results in very expensive and complex laser systems. Using the present embodiments, a laser with moderate power can be configured from relatively simple/cheap semiconductor lasers.

In some DiAL embodiments, where azimuthal angle is not important in the measurement and a derotator is being used, long integration times may be used to collect more photons with the imaging system 17. The vapor densities may be measured as a function of range along a conical surface. In such a case, the measurement would not only be a function of range, but would be over a range of azimuthal angles and along a specified conical angle. To reduce signals from near range backscatter, some embodiments may modulate the laser with a duty cycle so that light is received from the nearest range of interest after the trailing edge of the laser pulse has progressed passed a near-range region with excessive backscatter. Such an approach can help with dynamic range management and reduce out-of-focus near range signals interfering with signals from much more distant ranges.

In some embodiments, the Lidar system can be used for detection of received wavelengths that differ from the transmitted wavelengths via fluorescence Lidar techniques and Raman Lidar techniques. Though primarily targeted towards the use of lasers (with possible wavelength modulation for DiAL applications), the present embodiments may also use a modulated laser to improve range resolution. For example, each pixel within the detector array of the detector 259 in FIGS. 19A and 19B can be considered as sensing a volume. Time-delayed modulation at a particular pixel may be detected to refine a range measurement that is not spatially resolvable within the image plane of the detector 259. Because each pixel detects a volume that is limited in range extent, very high laser PRFs may be used without running into ambiguous range constraints.

In some embodiments, limited sensing volumes of each pixel in the detector 259 inherently reduces signal interference found in larger volumes. For example, if SPADS are used for detection, the detection of a photon may result in a dead time for the detector (e.g., 35 ns). When implemented in conventional Lidar, a backscatter event from near range scatterers can make a SPAD based detector blind to a more significant target a few feet further in range. In the current embodiments, however, different ranges get mapped to different pixels in the image plane of the detector 259, limiting the potential for near range interference.

Figure 21:
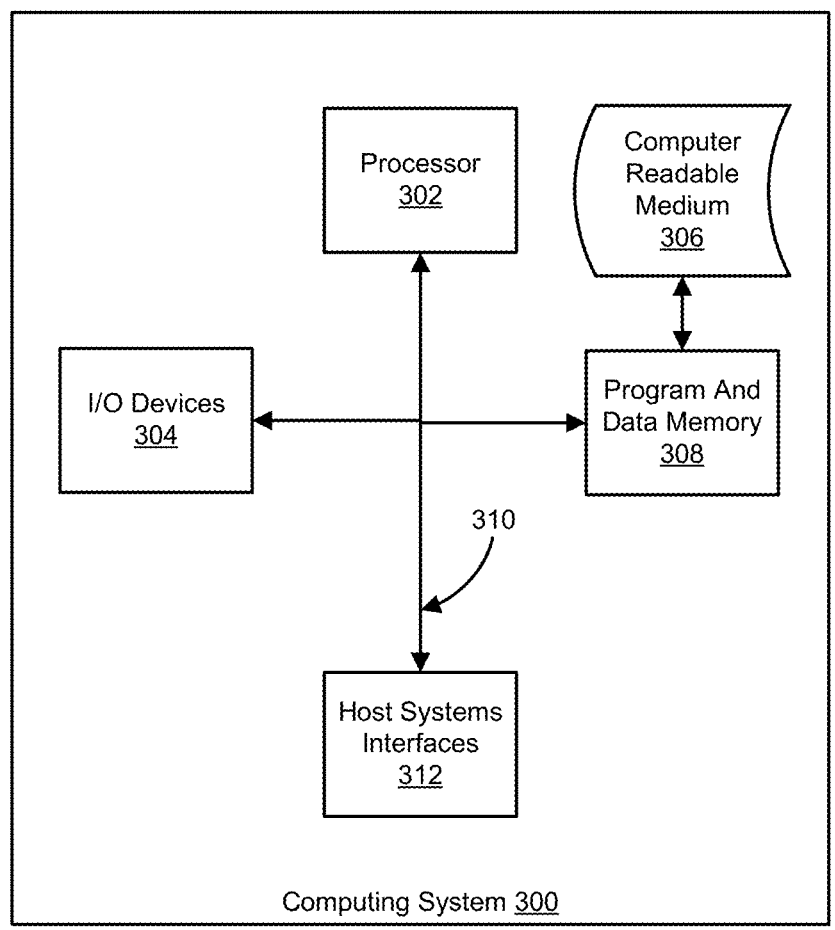
FIG. 21 is a block diagram of an exemplary computing system in which a computer readable medium provides instructions for performing methods herein.

Any of the above embodiments herein may be rearranged and/or combined with other embodiments. Accordingly, the Lidar concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 21 illustrates a computing system 300 in which a computer readable medium 306 may provide instructions for performing any of the methods disclosed herein.

Furthermore, the embodiments can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), NAND flash memory, a read-only memory (ROM), a rigid magnetic disk and an optical disk. Some examples of optical disks include compact disk-read only memory (CD-ROM), compact disk-read/write (CD-R/W) and digital versatile disc (DVD).

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems, cable modem and Ethernet cards are just a few of the currently available types of network adapters.

What is claimed is:

1. A Laser Ranging and Detection (Lidar) system, comprising:
 a laser operable to generate laser light;
 a transmitter operable to rotate at a first rate, and to transmit the laser light along a first path from the Lidar system to a target;
 a receiver operable to rotate at the first rate, and to receive at least a portion of the laser light along a second path from the target, wherein the first and second paths are different; and a processor operable to calculate a range and an angle to the target using an angular displacement between the second path and the receiver that arises from the first rate of rotation for the transmitter and the receiver.

2. The Lidar system of claim 1, wherein:
the receiver and the transmitter both rotate about axes aligned in a same direction.

3. The Lidar system of claim 1, wherein:
the receiver and the transmitter are attached by a common rotating shaft.

4. The Lidar system of claim 1, wherein:
the receiver and the transmitter each comprise a monogon shaped mirror.

5. The Lidar system of claim 4, wherein:
the mirrors of the receiver and the transmitter are configured at angles that are complementary to one another.

6. The Lidar system of claim 1, wherein:
at least one of the receiver and the transmitter comprises a transmissive scanner driven by a perimeter driven motor.

7. The Lidar system of claim 6, wherein:
the transmissive scanner comprises a rotating diffractive scanner.

8. The Lidar system of claim 6, wherein:
the transmissive scanner comprises a rotating refractive scanner.

9. The Lidar system of claim 1, wherein:
the receiver and the transmitter are operable to conically scan.

10. The Lidar system of claim 1, further comprising:
an axle configured to rotate the receiver and the transmitter to conically scan via a precession rotational axis.

11. The Lidar system of claim 1, further comprising:
a two dimensional detector array operable to image the light from the receiver.

12. The Lidar system of claim 11, further comprising:
a shutter operable to rotate at the first rate to remove laser light received from near range.

13. The Lidar system of claim 1, further comprising:
a derotator operable to rotate at one half the first rate to invert an image of the received laser light for imaging by an imaging system.

14. The Lidar system of claim 13, further comprising:
an imaging system that includes a one dimensional detector array operable to image the light from the receiver.

15. The Lidar system of claim 1, further comprising:
an imaging system that includes a detector comprising an array of detector elements,
wherein the processor is further configured to determine the range to the target based on spatial displacement of received laser light across the detector elements.

16. The Lidar system of claim 1, wherein:
the transmitted laser light is tuned on and off of an absorption line of a volumetric target.

17. The Lidar system of claim 1, further comprising:
a detector configured to detect a wavelength of received laser light that differs from a wavelength of the transmitted laser light due to distributed scatterers.

18. The Lidar system of claim 1, wherein:
the laser light comprises continuous wave laser light.

19. A Laser Ranging and Detection (Lidar) system, comprising:
a laser operable to generate continuous wave (CW) laser light;
a transmitter operable to rotate about a first axis and rotated to a first rotation angle, and to transmit the laser light from the Lidar system to a target;
a receiver separated from the transmitter, and operable to rotate about a second axis that is aligned in a direction of the first axis and rotated to a second rotation angle, and to receive at least a portion of the laser light from the target; and
a processor configured to calculate a range and an angle to the target using a difference between the first rotation angle and the second rotation angle that arises from an angular velocity of the transmitter and the receiver.

20. A method, comprising:
generating continuous wave (CW) laser light;
transmitting the laser light to a target from a transmitter rotating about an axis to a first rotation angle;
receiving at least a portion of the laser light from the target with a receiver rotating about the axis to a second rotation angle; and
calculating a range and an angle to the target using a difference between the first rotation angle and the second rotation angle that arises from an angular velocity of the transmitter and the receiver.

* * * * *